United States Patent [19]

Benjamin

[11] 4,252,217
[45] Feb. 24, 1981

[54] SEMI-AUTOMATED WAREHOUSING SYSTEM

[75] Inventor: John W. Benjamin, Lancaster, Pa.

[73] Assignee: Litton Systems, Inc., Florence, Ky.

[21] Appl. No.: 882,070

[22] Filed: Feb. 28, 1978

[51] Int. Cl.³ ............................ B66B 9/20; B65G 1/00
[52] U.S. Cl. .................................... 187/9 R; 187/26; 414/279; 414/284
[58] Field of Search .................... 214/16.4 B, 16 B; 187/26, 2, 7, 9, 17; 414/266-269, 274, 275, 277, 279, 281, 282, 284, 286, 241, 243, 246, 331

[56] References Cited

U.S. PATENT DOCUMENTS

| 348,610 | 9/1886 | Bassett | 187/26 |
|---|---|---|---|
| 1,288,567 | 12/1918 | Hall | 414/246 |
| 2,612,275 | 9/1952 | Chapman | 414/331 |
| 3,701,442 | 10/1972 | Dunning et al. | 187/26 X |
| 3,800,963 | 4/1974 | Holland | 214/16.4 B X |
| 3,805,973 | 4/1974 | Thompson | 214/16.4 B |
| 3,836,031 | 9/1974 | Weisker et al. | 214/16.4 A X |
| 3,869,028 | 3/1975 | Sawada et al. | 191/1 R |
| 4,007,843 | 2/1977 | Lubbers et al. | 214/16.4 B |

Primary Examiner—Stephen G. Kunin
Assistant Examiner—Edmond G. Rishell, Jr.
Attorney, Agent, or Firm—Herbert A. Stern

[57] ABSTRACT

A semi-automated warehousing system for unitized loads, such as load carrying pallets, which are retained in storage racks arranged in a multiple lane, multiple tier array is provided. The system employs a man operated stacker crane that travels upon a fixed rail and serves as a host vehicle for a ratio controlled transfer vehicle which is powered by a rechargeable battery. An elevator, which forms part of the crane is mounted between masts of the crane and a man carrying cab is secured to the elevator. The transfer vehicle can move laterally away from the crane, in either direction, in response to radio command signals controlled by the operator in the cab. The transfer vehicle rides on support rails in the storage racks and, upon command, deposits or picks up a pallet. The battery which powers the transfer vehicle is recharged each time the vehicle returns to the elevator portion of the crane.

18 Claims, 28 Drawing Figures

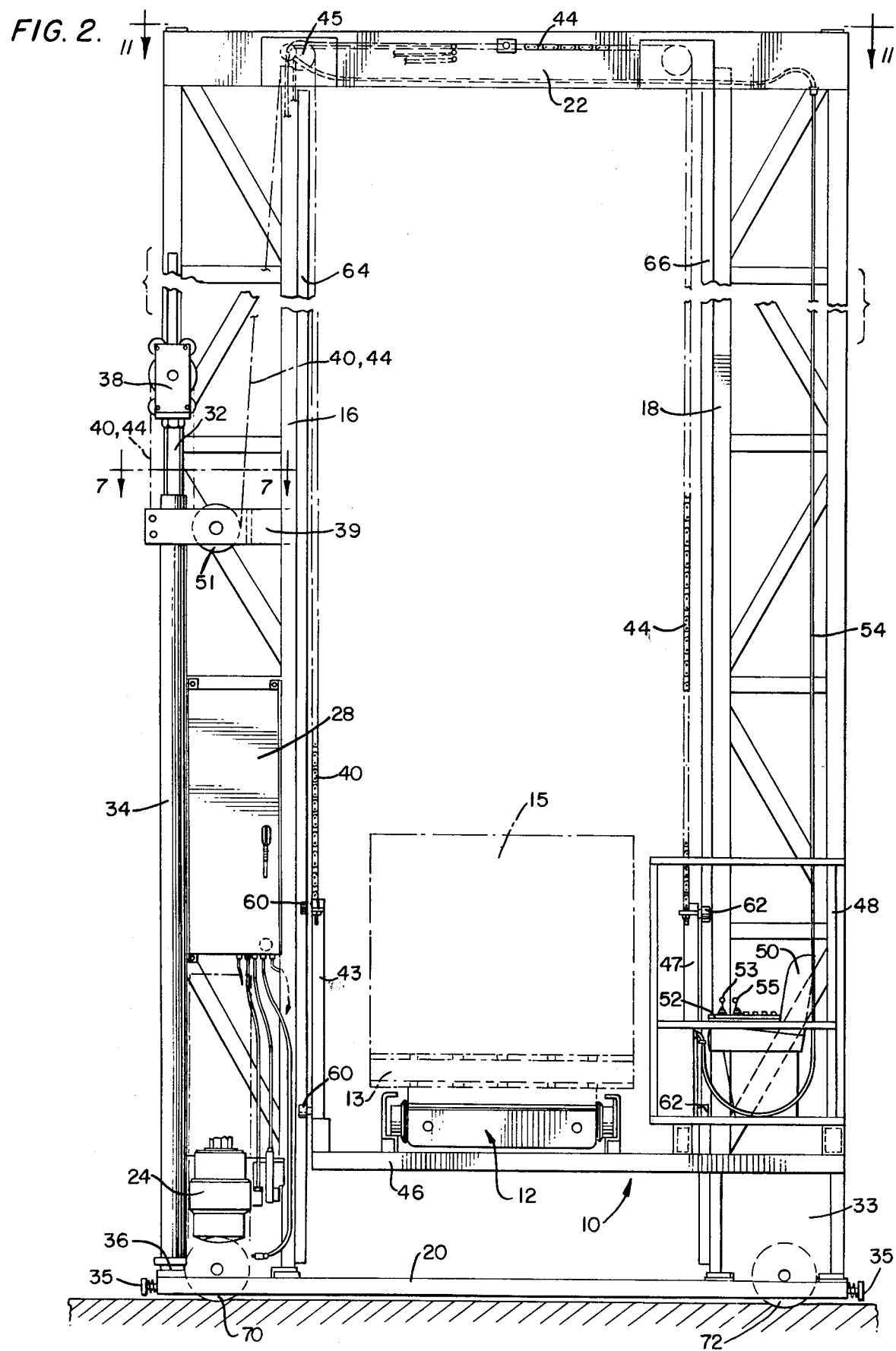

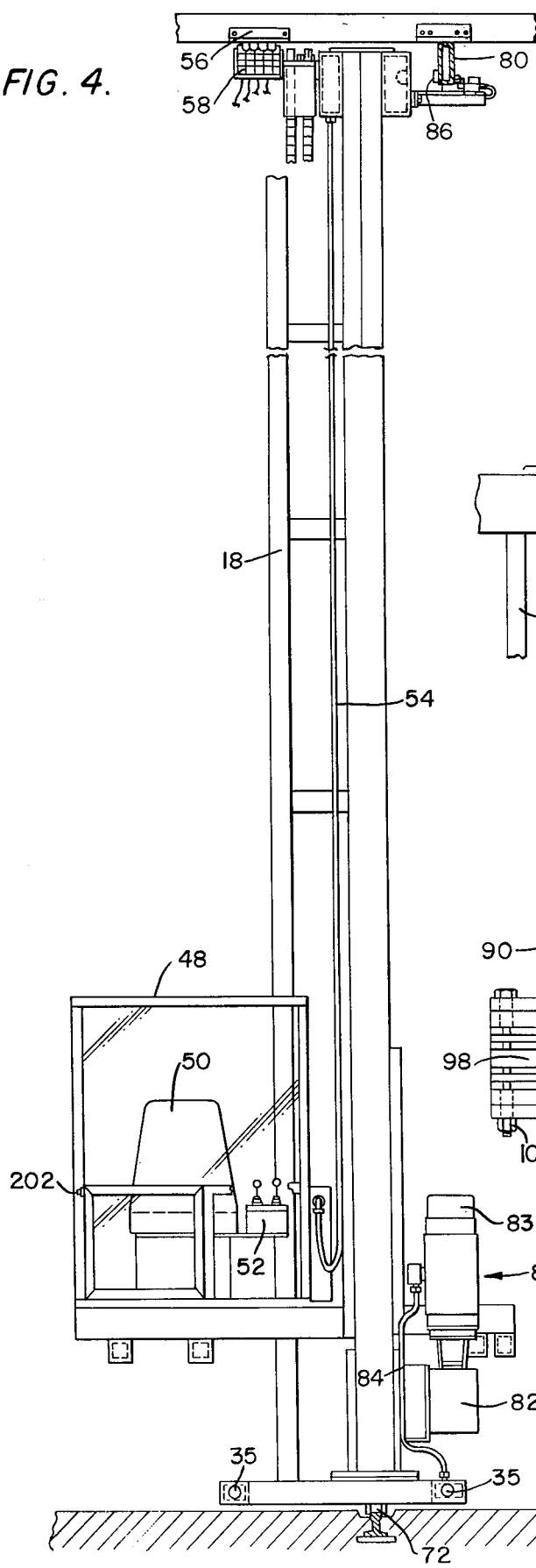
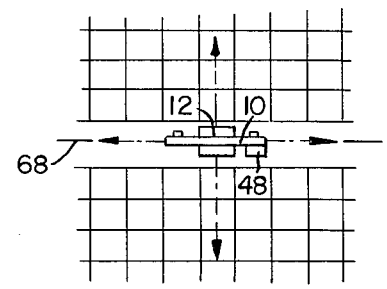
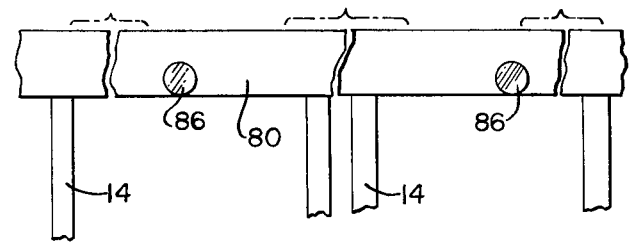
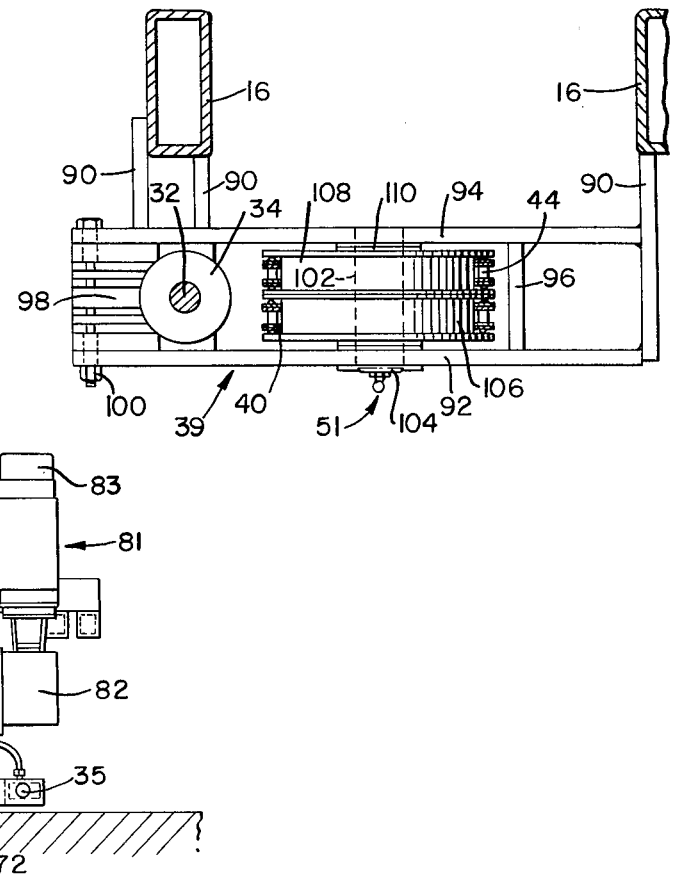

FIG. 6.
FIG. 8.
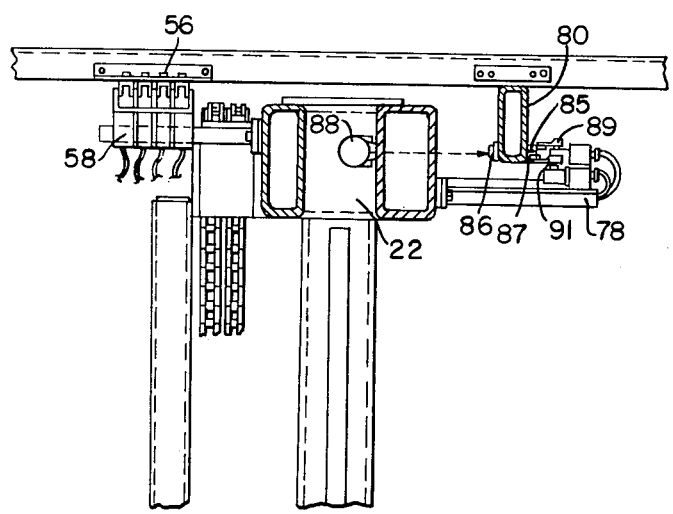
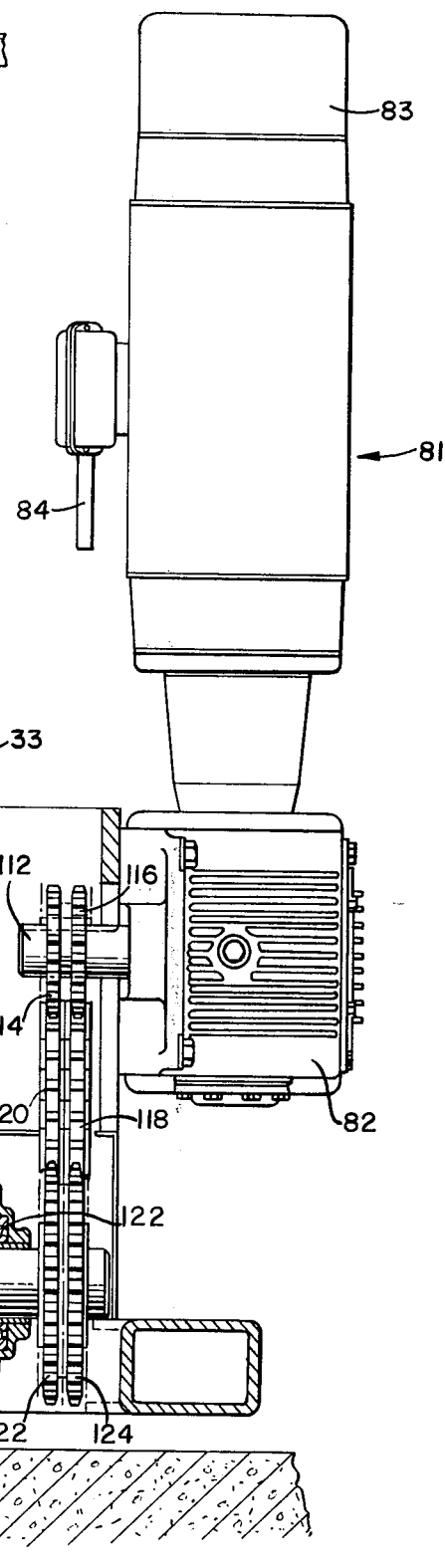

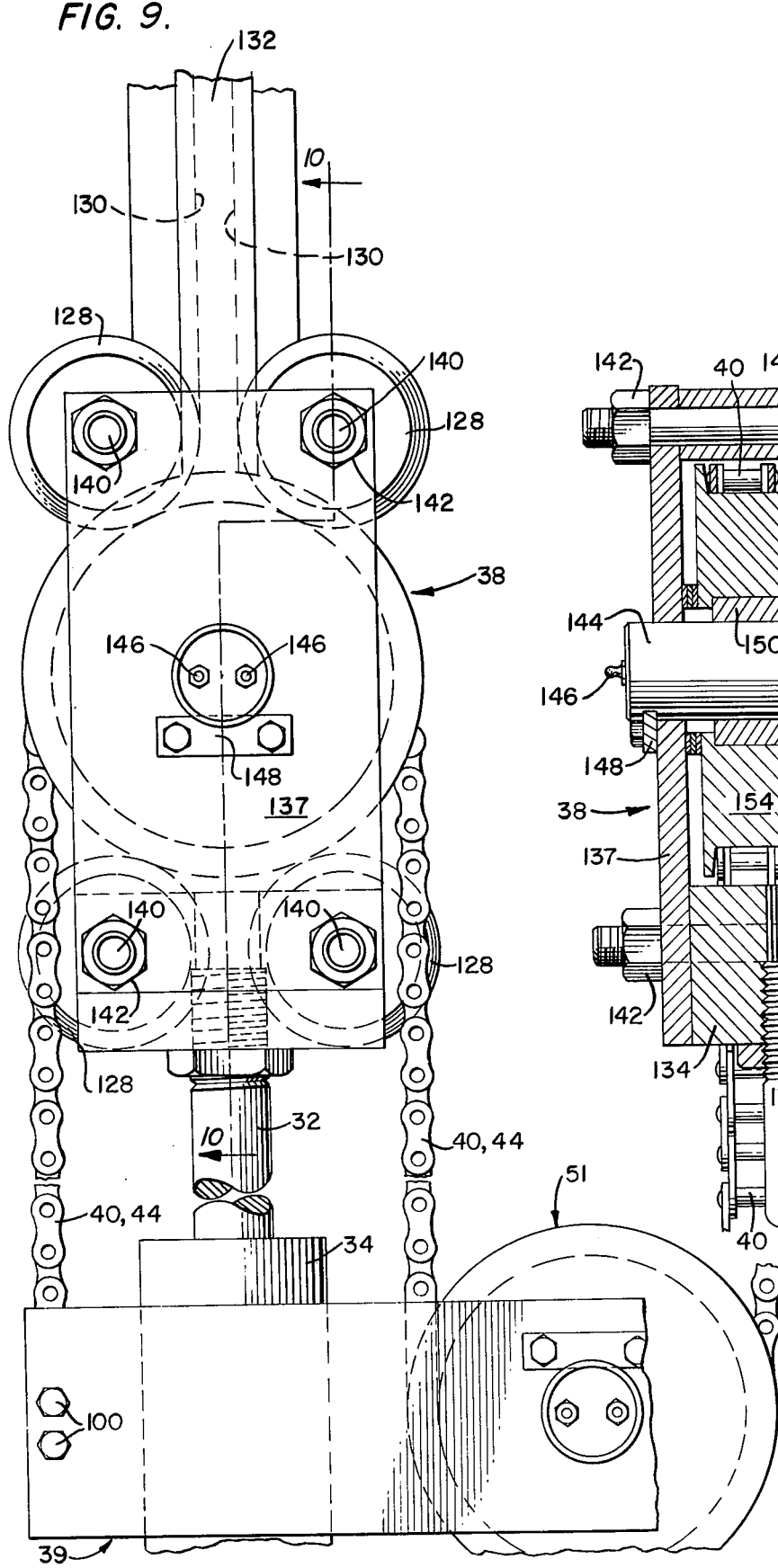
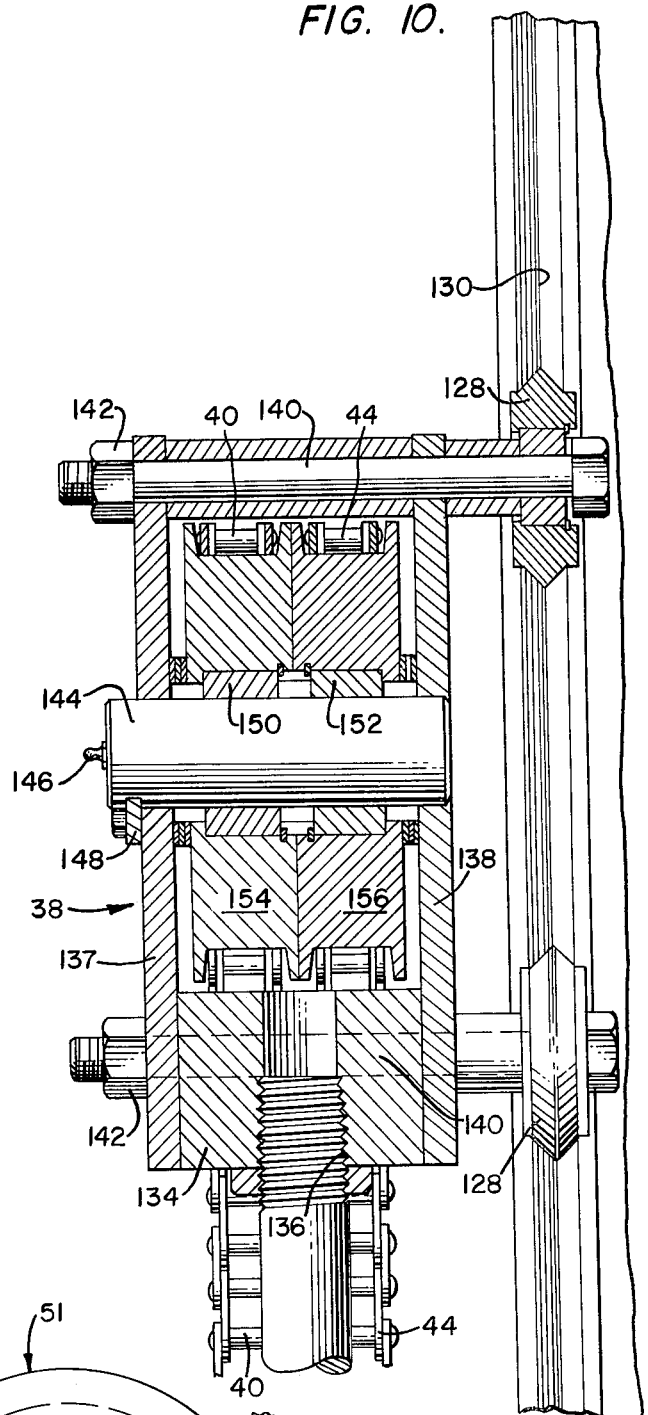
FIG. 9.
FIG. 10.

FIG. II.

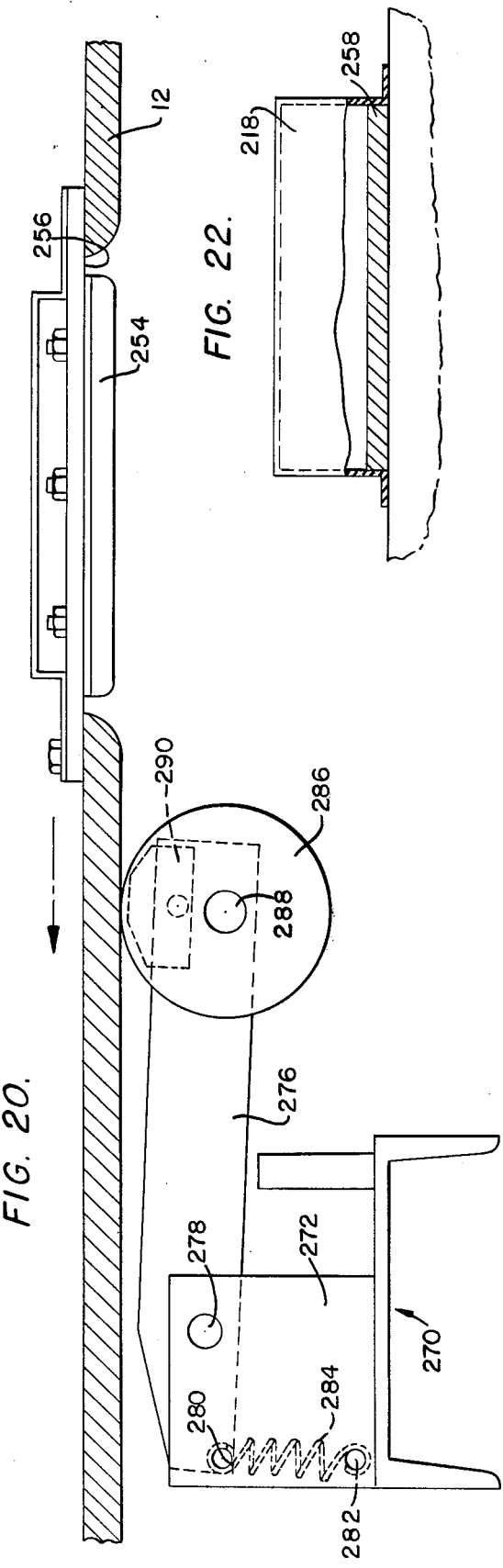
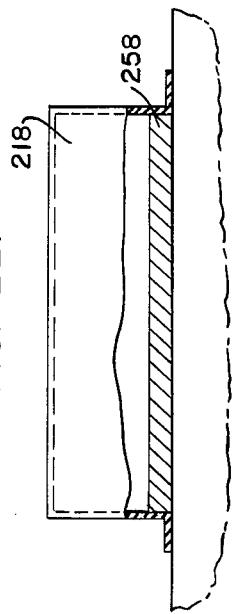
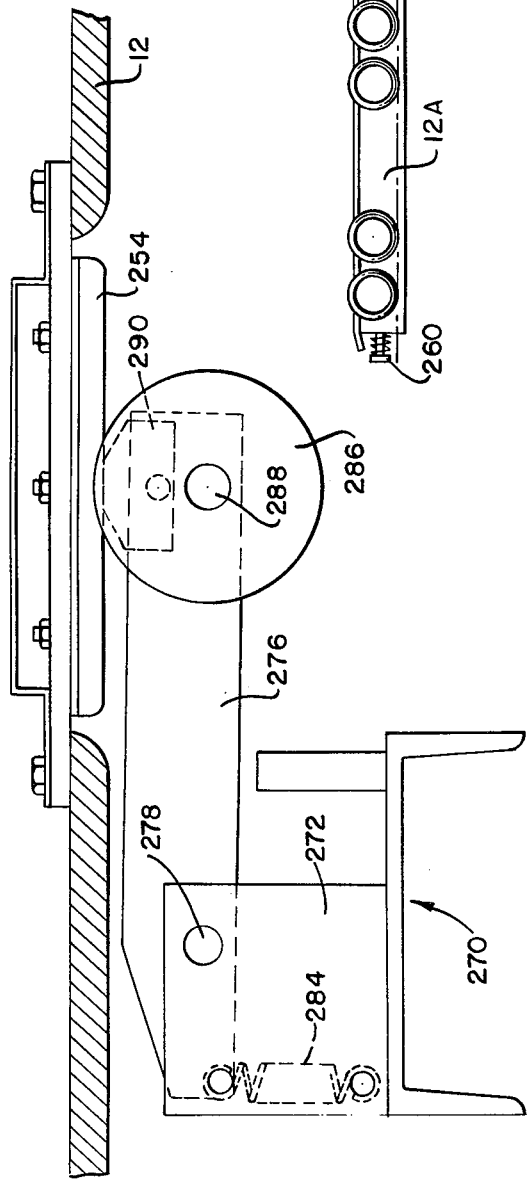
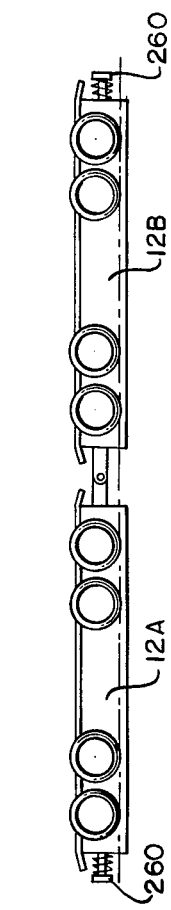

SEMI-AUTOMATED WAREHOUSING SYSTEM

BACKGROUND OF THE INVENTION

1. Field of the Invention

The instant invention pertains generally to semi-automated warehousing systems for transferring utilized loads to, from, and within, the system. More particularly, the instant invention relates to significant improvements in the stacker crane and transfer vehicle used to implement the warehousing system.

2. Discussion of Prior Art

One approach to effectively handling the increased demand for warehousing systems for unitized loads borne upon pallets has focused upon completely automated warehousing systems including multiple mobile lifts traveling at high speeds, numerous transfer vehicles operatively associated therewith, and computerized controls, including a central data processor, on-board computers and means for optically scanning land and tier markers during high-speed travel, for accurately depositing, or removing, a load-carrying pallet from a selected location on a storage rack. Such complex systems, while potentially increasing the through-put capacity of the warehousing system, have posed problems, such as significantly expanded capital costs for system installation related to the close tolerances that must be maintained within the system, inflated maintenance and operational costs and increases in "down-time" attributable to the need to utilize specially trained computer technicians for repair calls.

Also, since the transfer vehicles operatively associated with most mobile lifts can only service a storage position adjacent to the lift, several expensive lifts are required and a considerable amount of warehousing space must be surrendered for aisle space within which the lifts will travel. Some known automated warehousing systems attempt to save aisle space by replacing the transfer vehicles with shuttle tables, telescoping loading forks, or the like, that can service two pallet positions on each side of the aisle. However, such shuttle tables and telescoping loading forks are complex in construction, and expensive to operate and maintain.

The complexity of the control circuitry required for automated warehousing systems may be better appreciated by an inspection of U.S. Pat. No. 3,938,081, granted Feb. 10, 1976, to Robert T. Kirk while the limitations of the shallow rack storage capacity may be better appreciated by a review of U.S. Pat. Nos. 3,866,767 and 3,880,299, granted Feb. 18, 1975 and Apr. 29, 1975, to Howard A. Zollinger and LeRoy Lubbers, and to Howard A. Zollinger, LeRoy Lubbers and William K. Stubbs, respectively.

Another solution to the problem of attained high-throughput warehousing has been proposed in U.S. Pat. No. 3,800,963, granted Apr. 2, 1974 to Edward T. Holland. Such warehousing system, which may be broadly characterized as a semi-automatic system, relies upon an operator positioned in the cab on a stacker crane to visually observe, and manually control, the operation of a carrier that can be extended laterally away from the crane to deposit or retrieve a pallet from any storage lane and tier. In effect, the reasoning power of the operator replaces the decision-making capability built into the computer network associated with the above-described automated warehousing system.

Although the system disclosed in the Holland patent admits of greatly reduced installation and operational costs, and yet possesses the capacity to service two storage areas that are several pallets in depth from a single aisle, the location of the cab on the stacker crane limits the visibility of the operator. Also, the transfer vehicle is physically joined to the host vehicle as by a control-power cord, or belt. The dual cord poses significant problems since it must be kept taut at all times by a take-up mechanism, lest the cord interfere with the movement of the carrier in the storage rack; the constant winding and unwinding of the cord (especially in refrigerated environments), more often than not, results in breaking of the electrical conductors in the cord requiring replacement thereof at considerable cost and down-time of the system. Also, the cord had to be fabricated as a wide, thin belt to accommodate a plurality of electrical leads for power and other leads for control purposes; the belt had to be encased in an abrasion resistant coating.

To circumvent the problems associated with the control-power cord used in the semi-automated system shown in the Holland patent for energizing the transfer vehicle and furnishing control signals thereto, attempts were made to produce a battery powered transfer vehicle. Such vehicle would retain the mobility to service "deep storage" racks, and yet not be encumbered by an expensive and troublesome dual cord, also known in the trade as an umbilical cord. One such battery powered transfer vehicle is shown in U.S. Pat. No. 3,869,028, granted Mar. 4, 1975 to Yuji Sawada et al. The battery in the transfer vehicle is charged via a power line and an electrified shoe whenever the vehicle returns to its home station. The charging of the battery insures a fully effective source of power; also, insulation within the vehicle retains the heat imparted thereto so that the vehicle can operate for extended periods of time within cold storage warehouses without significant diminuition of the electrical potential of the battery.

However, Sawada et al relies upon an electrolytic battery that required an air intake pipe and a hydrogen gas exhaust pipe to release the excess gas produced by the recharging operation to the exterior of the warehouse, lest a spark ignite the hydrogen gas. If the hydrogen gas is not purged, the build-up may have a harmful impact on the performance of the battery.

SUMMARY OF THE INVENTION

The invention contemplates a semi-automated warehousing system employing a stacker crane of simplified construction that is driven by an operator seated in a cab situated for optimum visibility. In essence, the operator replaces the costly on-board and central computers utilized in the fully automated warehousing systems with attendant economies of installation, maintenance and operation without diminishing the accuracy of the pallet picking function. The tolerances employed in the semi-automated systems are not as demanding as those required by the fully automated systems, and further economies are thus realized.

The invention further contemplates a stacker crane that has a cab that can readily be enclosed and heated so that the operator can function comfortably under both cold-storage and ambient conditions within the warehouse. A control console, including a pair of joysticks and numerous other instrumentalities, and a radio transmitter responsive to the manipulation of such controls by the crane operator for sending control signals to the transfer vehicle, is situated within the cab adjacent to the seat for the operator.

The invention provides a hydraulic system, under supervision of the crane operator, for smoothly extending a piston to alter the effective length of lift chains that adjusts the elevator of the crane to the desired tier. The lane selection is made concurrently with the tier selection by the operator as he reads the visually observable address identifiers.

The invention is designed so that the stacker crane and elevator portion thereof move horizontally and vertically at the same time to increase the throughput. The transfer vehicle is interlocked with the hydraulic vertical and electrical horizontal drives and cannot be operated while the crane is in motion. Conversely, the crane cannot be moved while the transfer vehicle is in motion. Also, while the transfer vehicle is not centered on the crane, the crane cannot be moved horizontally, but vertical movement is permitted at slow speed to compensate for any misalignment within the selected lane.

Several provisions have been made within the instant warehousing system to minimize damage to the system, and avoid injury to the crane operator, in those infrequent instances when the operator experiences a mistake in judgment. To illustrate, if the operator fails to align the home station on the crane with the storage rack and then commands the transfer vehicle to enter the lane, the geometry of the transfer vehicle causes same to tilt down and come to a sudden stop attributable to the surface-to-surface engagement of stop bars on the transfer vehicle with stop members on the crane; the vehicle can then be commanded to return to its home station by the radio transmitter and will do so. Alternatively, the vehicle can be manually pushed back to its home station. If a power failure occurs, the elevator will remain in its actuated position, for a ratio check valve in the hydraulic system prevents the elevator from plummeting downward. Also, if the operator neglects to slow down to the "creep" speed as the crane approaches the end of an aisle, limit switches on the crane head are activated by cams on an overhead guide tube and override inappropriate manual commands in bring the stacker crane to a halt. Hydraulic shock absorbers and several other fail-safe provisions have been incorporated into the transfer vehicle as well as into the hydraulic circuit for the stacker crane.

Additionally, the invention contemplates a self-contained, battery-operated transfer vehicle that can be driven away from its home station on the stacker crane along the storage racks to a depth equivalent to several pallets. The batteries are sealed lead-acid cells wired in series to form a 24 volt battery pack. The use of a battery pack obviates the need for a power and control cord extending from the stacker crane as well as a take-up reel to maintain the cord taut and free from entanglements. Also, the lead-acid cells comprise a sealed unit that does not need special venting pipes and discharges only a minute quantity of hydrogen gas. The batteries are charged to full power while the transfer vehicle rests at its home station on the elevator of the stacker crane between its journeys into the storage racks, and spring-loaded contact fingers automatically interconnect the battery pack and battery charger when the transfer vehicle is centered on the stacker crane. Furthermore, the transfer vehicle can be driven laterally in either direction away from the stacker crane, at different pre-set speeds, in response to distinct radio-commands generated by the operator manipulating the controls in the cab of the crane, but the crane cannot be moved away from the selected lane and tier address until the transfer vehicle is centered on the elevator. Photoelectric cells and/or limit switches can be used to achieve the centering operation.

The battery charger services the battery pack with a constant DC supply of energy. Since the battery pack employs sealed lead-acid cells connected in series, the battery pack is readily maintained at peak efficiency by charging, as necessary, when the transfer vehicle is in its home position.

Refinements have been achieved in the design of the racks, per se, so that the several thousand feet of rack employed within each warehousing system can be more expeditiously assembled on the ground, and then pulled upright in large sections to be subsequently joined together.

The transfer vehicle and many features of the stacker crane are readily applicable to, and usable with, fully automated warehousing systems. The same holds true for the rack.

Yet additional advantages attributable to the design of the instant semi-automated warehousing system will become readily apparent to the skilled artisan when the specification is construed in harmony with the appended drawings.

BREIF DESCRIPTION OF THE DRAWINGS

FIG. 2 is a side elevational view of the stacker crane shown in FIG. 1;

FIG. 3 is a diagrammatic view of the system;

FIG. 4 is a side elevational view of the stacker crane depicting the cab and the motor set for driving the stacker crane;

FIG. 5 is a fragmentary view of the guide tube with reflectors thereon;

FIG. 6 is a side elevational view, on an enlarged scale, of the head piece of the stacker crane and the guide tube and trolley operatively associated therewith;

FIG. 7 is a horizontal cross-sectional view, on an enlarged scale, of a sheave secured to one mast of the stacker crane, such view being taken along line 7—7 in FIG. 2 and in the direction indicated;

FIG. 8 is a side elevational view, on an enlarged scale, of the motor set for horizontally driving the stacker crane;

FIG. 9 is a front elevational view, on an enlarged scale, of a detail of the stacker crane showing a hydraulic piston, a sheave and the lift chains operatively associated therewith;

FIG. 10 is a side elevational view of the sheave of FIG. 9, such view being taken along line 10—10 in FIG. 9 and in the direction indicated;

FIG. 20 is a fragmentary side elevational view of the contacts situated on the stacker crane and the bottom surface of the transfer vehicle;

FIG. 21 is a similar fragmentary side elevational view showing the contacts pressing against the transfer vehicle when the vehicle is in home position;

FIG. 22 is a detail view of the warming plate located within the transfer vehicle;

Figure 14:
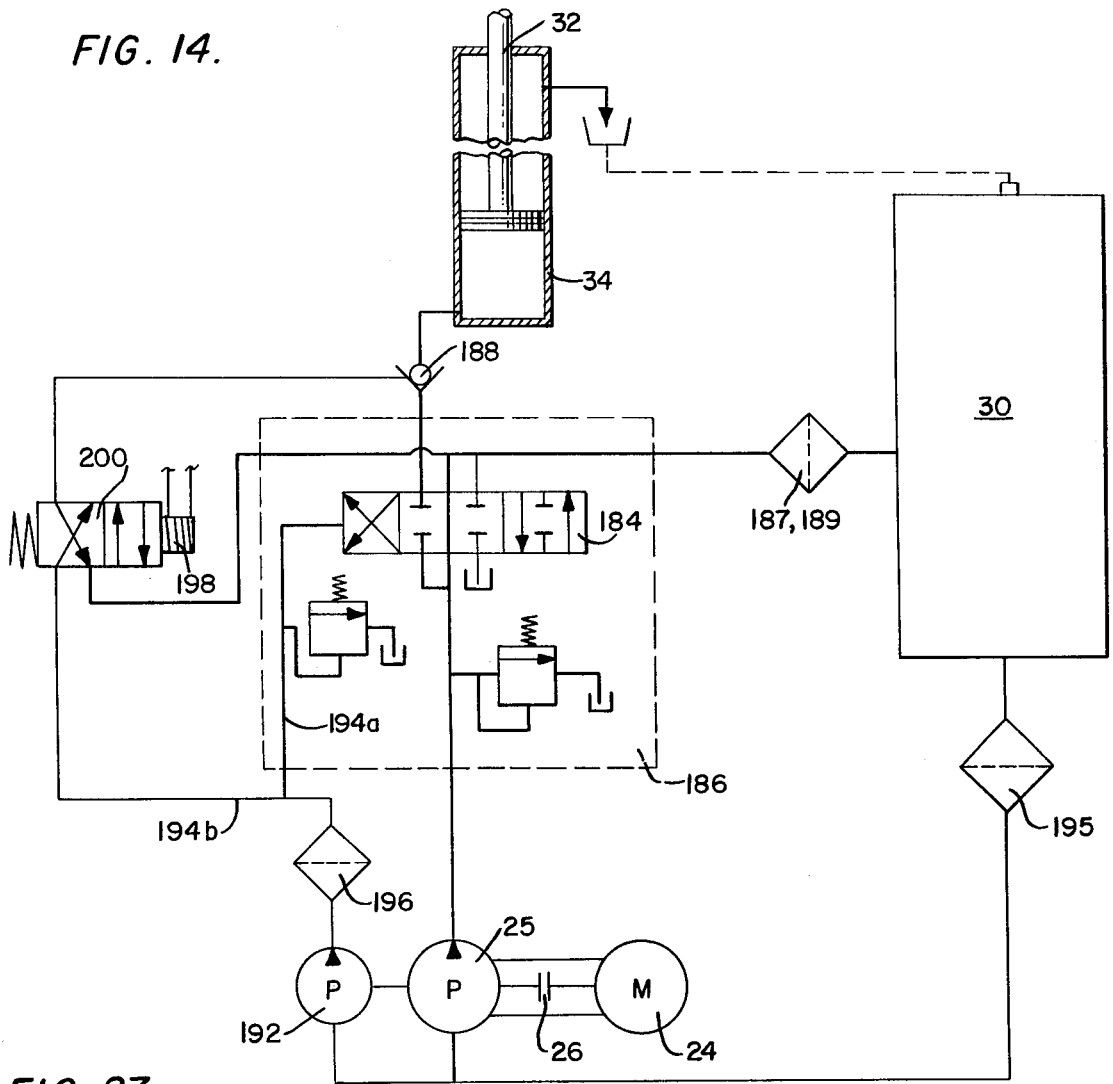
FIG. 14 is a schematic representation of the hydraulic system shown in FIGS. 12 and 13.
Figure 27:
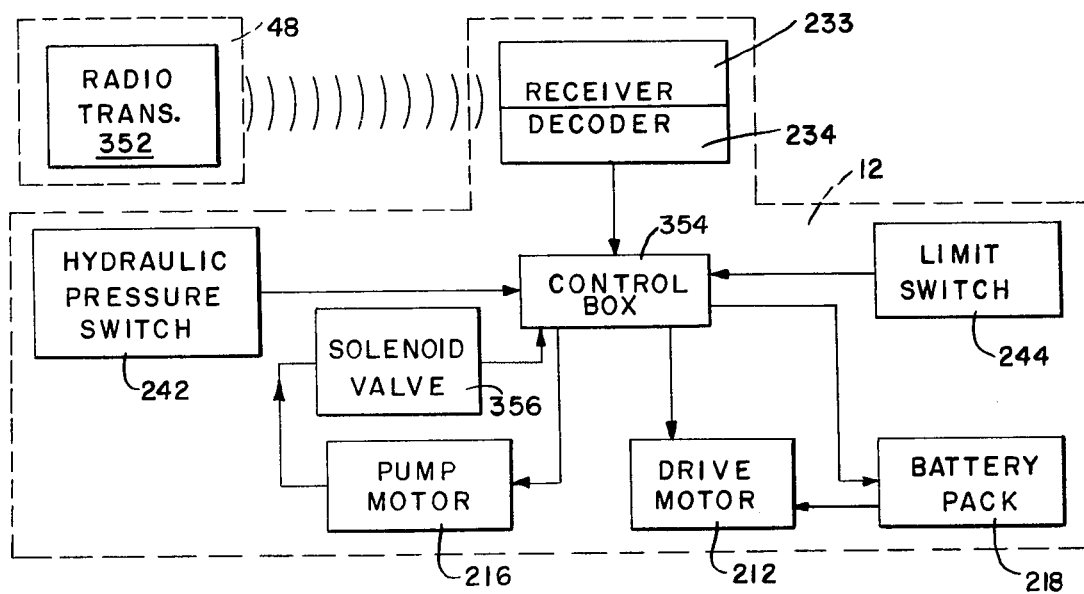

FIG. 27 is a schematic diagram showing the functional interrelationship between the radio transmitter on the stacker crane and the radio receiver, and related components, on the transfer vehicle; such diagram is situated on the sheet of drawings with FIG. 14; and FIG. 28 is a side elevational view, on a reduced scale, of two transfer vehicles coupled together; such view is situated on the sheet of drawings with FIG. 22.

DESCRIPTION OF A PREFERRED EMBODIMENT

Figure 1:
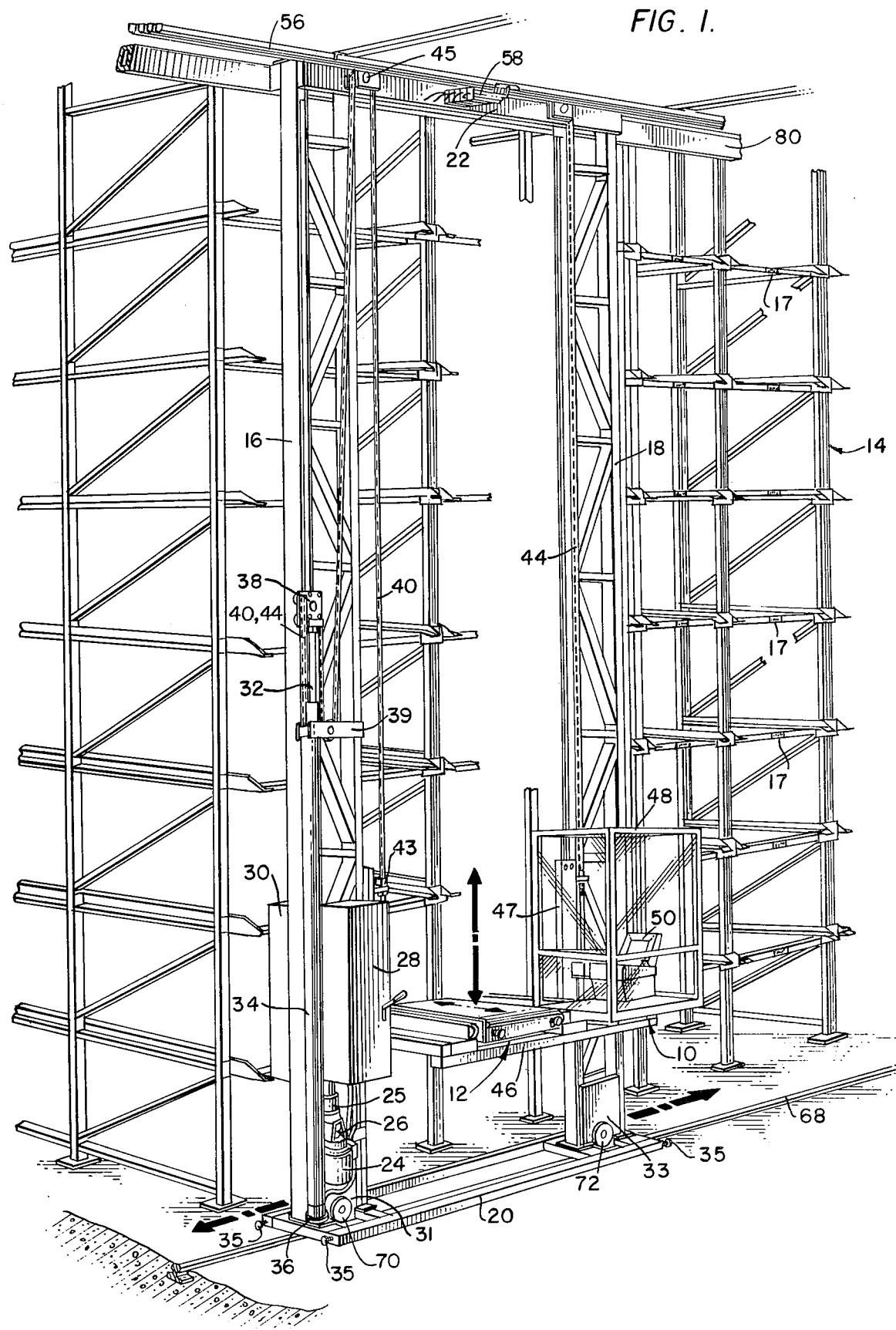
FIG. 1 is a perspective view of a warehousing system embodying the principles of the instant invention, such view showing the stacker crane, transfer vehicle, and storage racks of the unique system.

Referring now to the drawings, FIG. 1 shows a perspective view of a stacker crane, indicated generally by reference numeral 10, with a transfer vehicle, indicated generally by reference numeral 12, positioned thereupon. The stacker crane 10 and transfer vehicle 12 remove pallets 13 with loads 15 positioned thereon (not visible in FIG. 1 but shown in dotted outline in FIG. 2) from the storage racks, indicated generally by a reference numeral 14, deposit loaded pallets upon the storage racks, or transfer loaded pallets from one storage rack to another or between different positions within the same rack. Placards 17 are positioned on the storage racks at a location adjacent to the aisle, so that the address of the rack can be read by the operation in the stacker crane.

FIGS. 1 and 2 should be viewed together to fully understand the structural composition of the stacker crane 10. The stacker crane comprises a first mast 16 and a second mast 18 joined together at their lower ends by base 20 and at their upper ends by headpiece 22. The masts are formed with a truss configuration utilizing rectangular or tubular steel elements for maximum strength correlated to the maximum system loading. Although masts of 30-40 feet in height are contemplated, the masts can be changed in size to correspond to the height requirements of a particular application without making any alterations in the other components of the crane. A significant degree of part standardization is thereby realized.

The mast 16 supports the components of a hydraulic circuit including a thirty horsepower motor 24, a pump 25 driven by the motor for pressurizing the hydraulic fluid, a coupling 26 for transmitting the motive force of the motor 24 to the pump, control panel 28 for the electrical and hydraulic circuits, and an overized hydraulic reservoir 30 secured to the remote side of the mast. The control panel is situated within a sheet metal housing that can easily be opened. Rectangular end plates 31, 33 are secured to the lower ends of masts 16 and 18 to strengthen same.

Shock absorbers or bumpers 35 project outwardly from the opposite ends of the base 20 of the stacker crane; the shock absorbers are pressed inwardly when the crane contacts an obstacle during its travel, such as a projecting pallet or an end stop signaling that the crane is nearing a wall; the depression of the bumper immediately disables the driving force for the crane and brings same to a halt. If desired, shock absorbers could also be positioned on the head piece 22 of the stacker crane.

An extensible piston 32, which is extended upwardly out of hydraulic cylinder 34 under the control of the hydraulic circuit, is seated in a socket 36 on the base 20 of the stacker crane. A sheave nest 38 is secured to the upper end of the piston 32, and a bracket 39, formed of flat iron, is welded to one side of mast 16 slightly below the upper end of cylinder 34. One end of a first heavy duty lift chain 40 is secured at one end to the bracket 39, and the opposite end of the chain is anchored to a channel-like standard 43 on the elevator 46. A second heavy duty lift chain 44 is also secured at one end to the bracket 39, but the chain 44 extends laterally across the front face of headpiece 22 and is anchored at its opposite end to channel-like standard 47 on elevator 46. The lift chains 40, 44 pass over parallel sheaves in movable sheave nest 38 and is fixed sheave nest 51 for a portion of their path, but follow separate paths after passing through a first overhead sheave assembly 45 secured to headpiece 22.

Figure 25:
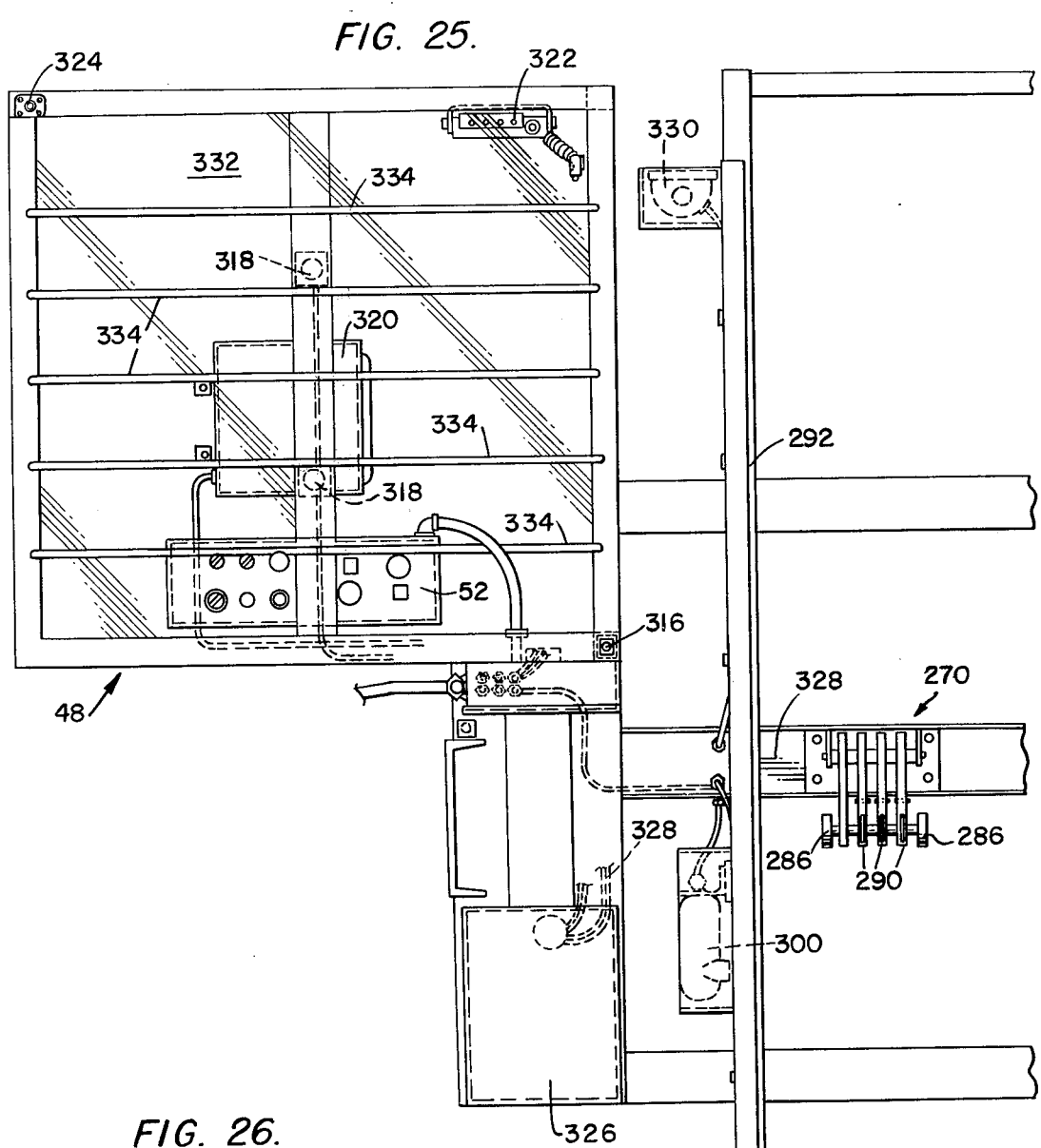
FIG. 25 is a top plan view of the cab of the stacker crane and the home position for the transfer vehicle on the crane.

The elevator 46 extends transversely between the masts 16 and 18 for movement relative thereto, and a cube-like cab 48 is secured at its underside to the elevator proximate to the mast 18. The elevator is preferably formed as a single weldment of tubular members. A seat 50 is provided in the cab, and a control panel 52 with several manually operable controls, including "joysticks" 53, 55, push buttons and key-locks, is situated adjacent to the seat on the right side of the cab 48. Cab 48 is offset with respect to the position occupied by a load 15 on pallet 13 so that the operator's field of vision is not impaired. Joystick 53 controls the operation of the stacker crane, while joystick 55 controls the operation of the transfer vehicle operatively associated with the stacker crane. Although an open cab is used for a warehousing system wherein ambient temperatures are acceptable, the cab 48 is enclosed with plexiglass panels on all sides and a heater is installed under the seat 50 so that the operator can be comfortable in the inhospitable temperatures encountered in cold-storage warehouses. The enclosed cab is shown in FIG. 25 in detail.

An electrical power line 54 extends across headpiece 22 and then travels downwardly between the cab 48 and the mast 18 to deliver power to the control panel 52, the radio transmitter, the lights, etc. in cab 48. The power line is energized from an overhead electrical power distribution line 56 via a contact trolley 58 with four pick-up shoes that move with the crane and slide along the bus bars of line 56.

The first channel-like standard 43 is secured to one side of the elevator 46, and the second channel-like standard 47 is secured to the elevator proximate to the cab 48. Standard 43 has two pairs of guide rollers 60 secured thereon, and standard 47 also has two pairs of guide rollers 62 secured thereon. Guide rollers 60 ride along a vertically extending rib 64 secured to the inner surface of mast 16, while guide rollers 62 ride along an identical rib 66 secured to the inner surface of mast 18.

Stacker crane 10 travels along a single rail 68 that is either recessed in a trough in a newly constructed building floor, or is mounted on top of the floor in an existing building. The increased structural rigidity of the crane allows the use of a single rail 68 with material attendant economies in installing the warehousing system. A first flanged wheel 70 is situated beneath mast 16 adjacent end plate 31, and a second flanged wheel 72 is situated beneath mast 18 adjacent end plate 33. The flanged wheels ride along the rail 68.

FIG. 3 is a diagrammatic view illustrating the applicability of the instant, semi-automatic system to deep-storage warehousing. A single stacker crane 10 traveling on a track situated in an aisle between two storage cubes made up of numerous storage racks that can accommodate several pallets, can efficiently service the entire length and width of the cubes with but a single transfer vehicle 12. The stacker crane can travel along the track at speeds of two hundred or more feet per minute under control of the operator in cab 48, and can stop quickly at the selected lane and tier. The operator then instructs the transfer vehicle to leave the elevator 46, via radio commands, and enter the storage racks to the right or left of the aisle, and perform the desired work function regardless of the lateral distance between the first loaded pallet and the aisle where the stacker crane is situated. The ability to successfully operate from the work face of a storage cube is known as deep-storage warehousing, and distinguishes the instant system from the shallow pallet handling capability of conventional warehousing systems.

FIG. 4 shows additional structural details of the mast 18 of crane 10, for such view is taken from the right side of the mast 18 looking into the rear of cab 48. The electrical motor set 81 for driving the stacker crane along the rail 68 is visible. The motor set includes a high speed motor for driving the stacker crane at high speeds up to two hundred or more feet per minute, and a second, low speed motor for "creep" speeds used as the stacker crane approaches its destination or the end of the aisle. The motor set delivers its power to gear reducer 82, which through a chain and sprocket drive, applies power to wheel 72 to advance the stacker crane. Wheel 70 supports mast 16 but no power is delivered thereto. The crane can be stopped quickly and precisely by a solenoid operated brake 83 that disables the motor set 81. The details of the power transmission system for wheel 72 will be discussed at a later point in the specification with reference to FIG. 8.

FIG. 4 also illustrates the interconnection between shock absorbers 35 and motor set 81. When the shock absorbers encounter an obstacle and are pressed inwardly, an electrical signal is conveyed via conduit 84 to the motor set. Such signal actuates the brake 83 which disables the motor set to prevent continued horizontal movement of the stacker crane in the same direction.

FIGS. 4 and 6 depict the apparatus that enables the stacker crane to sense its location within the aisle relative to the storage racks 14. A reflex control 88 is secured within the headpiece 22 of the stacker crane. The control 88 scans spaced reflectors 86 secured to the face of a guide tube 80 as the stacker crane passes thereby. Each reflector 86 is spaced along the guide tube 80 to correspond to a lane location. Also shown in FIGS. 4 and 6 are the contact trolley 58 and the overhead power distribution line 56, which are situated in front of the headpiece 22, i.e., on the side opposite guide tube 80. In addition to having reflectors 86 spaced along one face, the guide tube 80 has a pair of cam surfaces 85, 87 secured to its reverse or opposite face or side. A pair of limit switches 89, 91 are situated on a bracket 78 in operative relationship to the cam surfaces; the interrelationship between the limit switches and the cam surfaces will be explored in greater detail at a later point in the specification.

FIG. 5 shows a fragment of the front face of guide tube 80 with reflectors 86 spaced therealong. As noted previously, the reflectors are spaced apart a distance corresponding to the width of a lane.

FIG. 7 reveals that the masts 16 and 18 of the stacker crane are formed from rectangular tubing, and that the bracket 39 is welded to the front face of mast 16 by several forwardly extending arms 90. The bracket 39 includes a front plate 92, a rear plate 94, a rib 96, several shims 98, and a nut and bolt 100 passing through the plates and the shims for securing same together. An arcuate cutout is defined in the shims to receive, and support, the upper end of hydraulic cylinder 34 therein.

The fixed sheave nest 52 that is secured within bracket 39 includes a shaft 102 that extends through plates 92, 94, a lubrication fitting 104, a pair of sheaves 106, 108, and spacers 110 for positioning the sheaves on the shaft 102. Lift chain 40 passes about sheave 106, and lift chain 44 about sheave 108, in parallel fashion.

FIG. 8 points out that the motor set 81 includes a solenoid operated, normally engaged brake 83, and a high speed, low torque motor and a low speed, high torque motor housed in a single, vertically oriented shell. The rotors for the two motors are mounted on a common shaft. The brake 83 is released and the motors are alternatively engaged under the control of the operator in cab 48 as he manipulates the joysticks on the control panel 52. The output torque from the common shaft of the motor set 81 is transmitted to gear reducer 82, and the output from the gear reducer rotates shaft 112 and the sprocket gears 114, 116 secured thereto. A pair of chains 118, 120 are entrained over sprocket gears 122, 124 mounted on shaft 126. The chains transfer the motive driving power from the gear reducer to the driving wheel 72 for horizontally propelling the stacker crane. Driving wheel 72 is secured on shaft 126, which extends laterally beyond the end plates 33 secured to the lower end of mast 18. Bearings 122 extend through the plates and insure the smooth movement of wheel 72 along rail 68 as the stacker crane is driven horizontally along rail 68.

FIG. 9 depicts the relationship of the movable sheave nest 38 and the fixed sheave nest 51 secured within bracket 39, while FIG. 10 shows additional details of the movable sheave nest 38. The movable nest 38 is threadedly engaged to the upper end of extensible piston 32, and the nest moves with the piston by virtue of four guide rollers 128 that ride in grooves 130 on opposite faces of guide bar 132. Guide bar 132 is secured to the forward face of the mast 16, and extends from a point near the upper end of piston 32 in its unactuated position upwardly to the headpiece 22 as shown in FIG. 1.

A mounting block 134 has an axially extending internally threaded recess 136 to receive the threaded end of piston 32. The block fits between side plates 137, 138 at the lower end thereof. Elongated bolts 140 with threaded ends extend through guide rollers 128 and the side plates 137, 138 of the movable nest 38, and nuts 142 are secured onto the threaded ends of the bolts of secure these components together.

A cylindrical shaft 144 fits into recesses in side plates 137, 138 and extends therebetween, and fittings 146 allow lubricant to be introduced into the shaft. A removable locking plate 148 retains the shaft in fixed position. A pair of roller bearings 150, 152 are operatively associated with the shaft, and a first sheave 154 is joined to the first roller bearing and a second sheave 156 is joined to the second roller bearing. Chain 40 passes about sheave 154, while chain 44 passes about sheave 156, so that the chains travel in parallel paths as they enter and leave the movable sheave nest 38 before entering fixed sheave nest 51.

Figure 11:
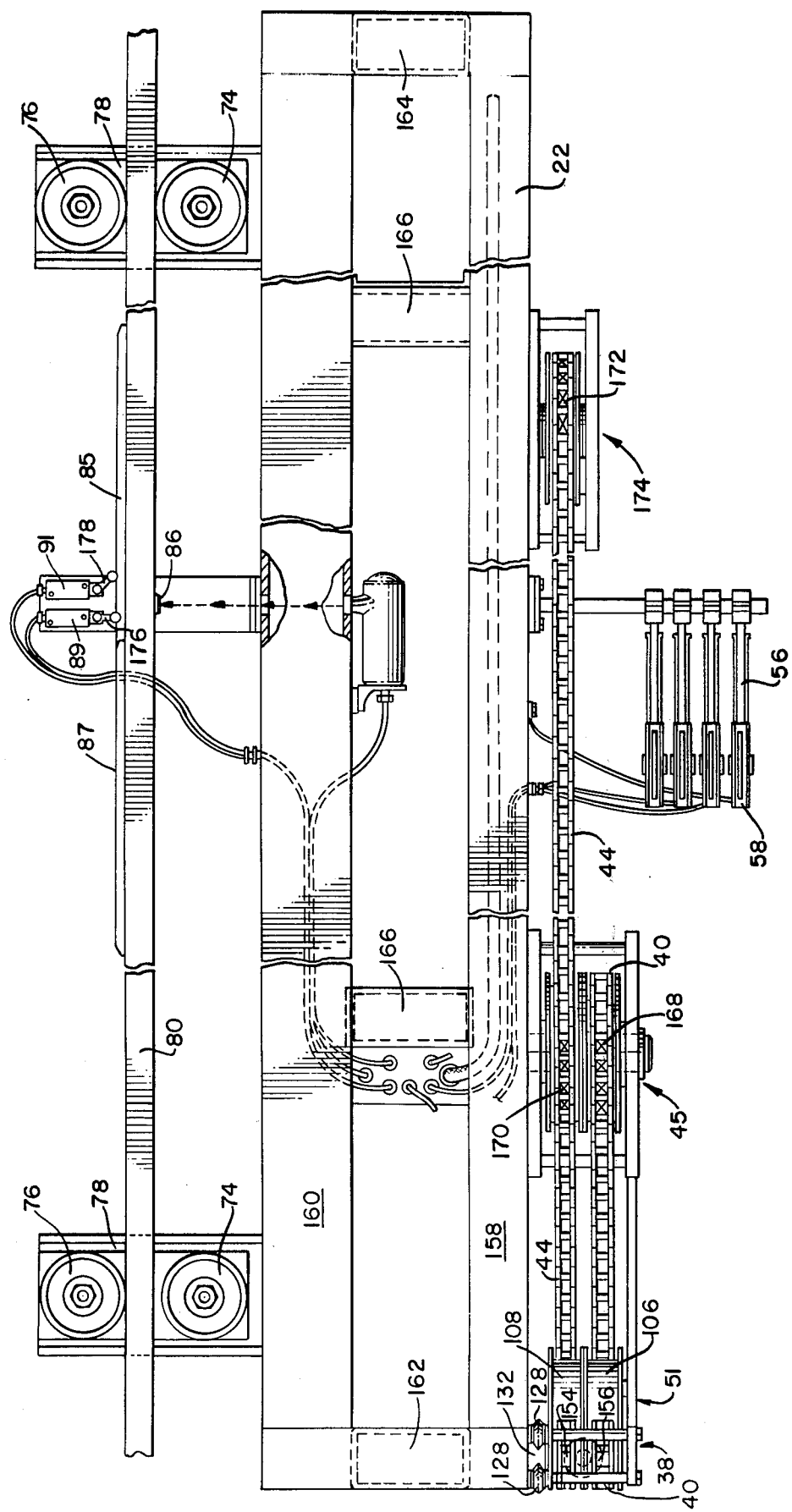
FIG. 11 is a top plan view of the head piece of the stacker crane showing the guide tube operatively associated therewith, and the sheaves and the chains cooperating therewith; such view being taken along the line 11—11 in FIG. 2 and in the direction indicated.

FIG. 11 shows that two pairs of identical guide rollers 74, 76, which are supported upon spaced brackets 78, bear against the opposite sides of the guide tube 80. Headpiece 22 is a rigidified rectangle composed of a front member 158 and a rear member 160, side members 162, 164, and intermediate braces 166. The brackets 78 which support the guide rollers are secured to rear member 160. Also, the tubular structural members from which masts 16 and 18 are fabricated are shown in dotted outline to indicate the relationship of the headpiece to the masts.

To further stabilize the stacker crane, as well as to provide additional control functions, guide rollers 74, 76 are mounted on brackets 78 to ride along the opposite faces of rectangular guide tube 80, suspended from the ceiling as shown in FIG. 11. The brackets and guide tube are shown in detail in FIGS. 4, 5, 6 and 11. The stacker crane travels on rail 68, and is propelled therealong at high, or low, speed. The guide rollers 74, 76 are situated on the remote side of the headpiece 22, and are thus not visible in FIGS. 1 and 2.

The spatial and functional relationship among the numerous sheaves in the path of the chains 40 and 44 are shown in FIG. 11 when viewed in conjunction with FIGS. 1, 2, 7, 9 and 10. Thus, chains 40 and 44 are secured at one end to the fixed bracket 39, travel upwardly about the sheaves 154, 156 in the movable sheave nest 38, travel downwardly beneath the sheaves 106, 108 in the sheave nest 51 and travel upwardly over a pair of parallel sheaves 168, 170 in the first headpiece sheave assembly 45. At this point, the paths of the two chains diverge, for chain 40 travels over sheave 168 and then travels downwardly to terminate in a clevis on the channel-like standard 43. Chain 44, on the other hand, passes over sheave 170 and then continues across headpiece 22 to pass about the single sheave 172 in the second fixed headpiece sheave assembly 174, before traveling downwardly to terminate in a clevis on the channel-like standard 47. The configurations of the first and second headpiece sheave assemblies 45 and 174 are shown in FIG. 11.

The length of chain 40 extending between bracket 39 and the clevis on standard 43 is fixed; similarly, the length of chain 44 extending between bracket 38 and the clevis on standard 49 is fixed. The length of chain between the bracket 39 and the midpoint of the movable sheave nest 38, which may be deemed as the upstream length of the chain, varies with the movement of extensible piston 32; obviously, as the upstream or effective length of the chain increases, the remainder, or downstream length, decreases. A similar upstream-downstream relationship prevails for chain 44 in relation to movable sheave nest 38. Consequently, when the sheave nest 38 is shifted upwardly and the upstream lengths of chain increase, the elevator 46 is adjusted vertically in an even manner by chains 40 and 44.

It should be noted that the spatial relationships between hydraulic cylinder 34, the movable and fixed sheave nests 38, etc., are selected so that the weight of the elevator, and the load thereupon, exerts a downward compressive force on piston 32. The piston exhibits its greatest strength under such compressive loading.

FIG. 11 shows the manner in which electrical power is made available for introduction into the headpiece 22 of the stackwer crane. Several leads conduct the power to the overhead power distribution line 56, and the contact trolley 58 rides therealong. Four lines are used for three phase power and a ground line. Other leads energize reflex control 88 that "looks" through aligned apertures in the headpiece to detect reflectors 86 on guide tube 80. As the stacker crane is driven horizontally relative to guide tube 80, cam followers 176, 178 ride along cam surfaces 85, 87. The cam surfaces are of unequal length, and the cam followers 176, 178 cooperate with the limit switches 89, 91 to detect the contour of the cam surfaces 85, 87.

The cam surfaces 85, 87, on the rear surface of guide tube 80, in cooperation with cam followers 176, 178 and limit switches 89, 91, comprises one of the significant safety features for the stacker crane 10. If the operator were to maintain the joystick 53 in an actuated position, and the stacker crane were to reach the end of an aisle and approach the warehouse wall while traveling at a significant rate of speed, the conventional stops (not shown) which depress the shock absorbers on the crane might prove to be ineffectual in avoiding a disastrous collision. However, cam surfaces 85, 87, which are vertically spaced above one another and are of unequal length, render such collisions well nigh impossible. Even if the operator were to maintain joystick 53 in its full-forward, or high speed position, as cam follower 178 drops off cam surface 85, the high speed motor in motor set 81 is de-energized and the low speed motor is energized. When cam follower 176 drops off cam surface 87, indicating that the crane is approaching a wall, the brake 83 situated atop the motor set 81 is energized and the motors are instantaneously stopped. The safety feature thus overcomes any error in judgment by the operator.

Figure 12:
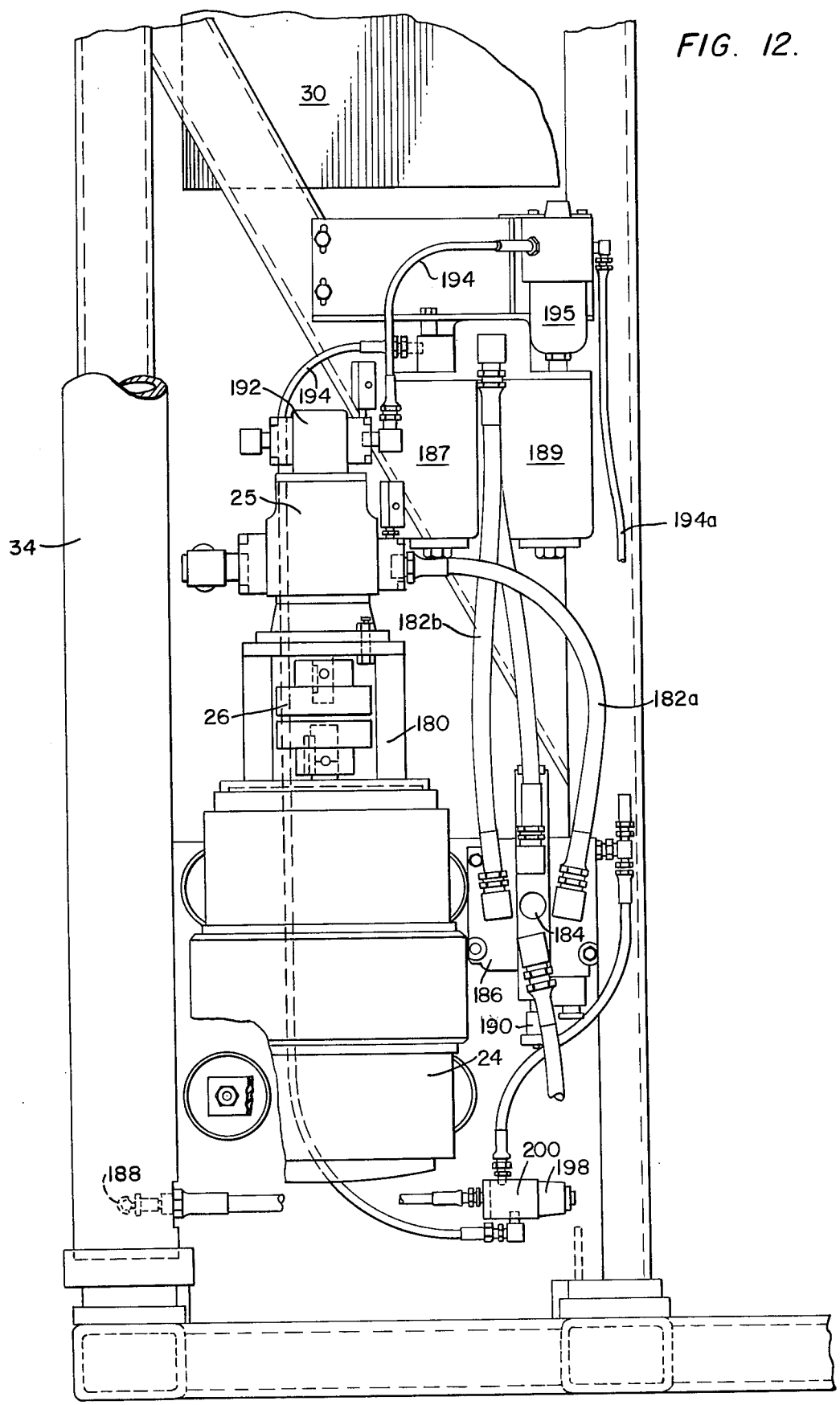
FIGS. 12 and 13 are complementary elevational views, on an enlarged scale, of the hydraulic system for the stacker crane.
Figure 13:
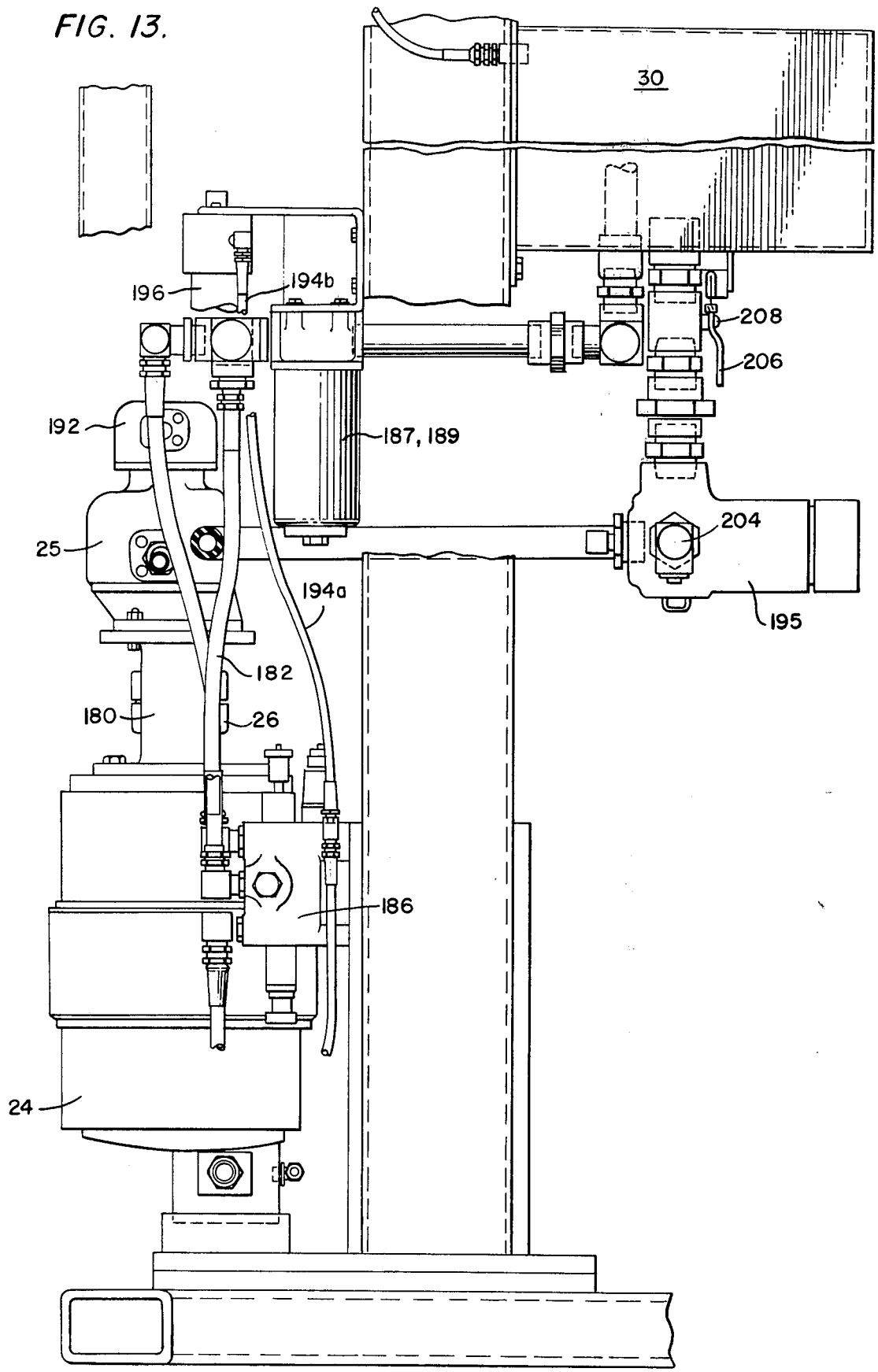

FIGS. 12 and 13 depict the components of the hydraulic system for controlling the operation of the extensible piston 32. To facilitate the discussion of the system, the system may be divided into two interrelated circuits. The first hydraulic circuit, which is the power supply circuit, includes the thirty horsepower motor 24 that drives the main pump 25 via a suitable coupling 26. The motor 24 and pump 25 are retained in operative relationship by an adapter 180 that extends axially between the motor and pump. The adapter is bolted, at its opposite ends, to the casings for the motor and the pump.

The pump 25 forces the hydraulic fluid through hose 182a toward the hydraulic cylinder 34. A spool valve 184 is located within housing 186, and the position of the spool valve 184 (seen in FIG. 14) controls the amount of hydraulic fluid passing through the housing toward a ratio ball check valve 188 located in the base of cylinder 34 and upstream thereof. The spool valve 184 serves as a proportioning valve under certain conditions. When the flow of hydraulic fluid through housing 186 is blocked by the spool valve 184, and the pressure build-up exceeds a predetermined level, a relief valve 190 opens and allows the hydraulic fluid to be vented or returned to the hydraulic reservoir 30 through hose 182b and a pair of in-line filters 187, 189. The spool valve 184 is biased to normally allow the hydraulic fluid in hose 182a to pass through the housing and return to the reservoir over hose 182b without unseating the ratio ball check valve 188.

The second hydraulic circuit is a pilot-assisted control circuit, which adjusts the position of spool valve 184 in the power supply circuit. The second circuit includes a small pump 192 that is mounted in piggyback fashion atop main pump 25, and is also driven by motor 24 via coupling 26. The small pump 192 sucks hydraulic fluid over hose 194 from the reservoir 30 after the fluid has passed through suction filter 195. Since the pilot-assisted control circuit operates at a lower pressure and upon a much smaller quantity of fluid, the diameter of hose 194 may be half, or less, of the diameter of hose 182.

The pump 192 forces the hydraulic fluid through a high pressure filter 196. Downstream of filter 196, the hose 194 divides into branches 194a and 194b. The first branch 194a leads into housing 186, wherein the hydraulic fluid exerts a biasing force upon spool valve 184. A solenoid 198 governs the operation of the valve 200 situated in the second branch of the conduit 194b. Normally, the valve is biased in its closed position, so that the flow through the second branch 194b is blocked, and the hydraulic fluid returns to reservoir 30 after passing through return filter 187. When the valve 200 is opened by the energization of solenoid 198, the hydraulic fluid will flow past the valve seat and exert pressure upon ratio ball valve 188.

When solenoid 198 is energized, valve 200 is shifted and the fluid in hose 194b passes through the valve and acts to unseat ball check valve 188 in the base of the hydraulic cylinder 334. Since the back pressure, or biasing pressure, will be terminated or diminished in hose 194a, valve 184 will also be moved out of its normal blocking position and the fluid pressurized by main pump 25 will flow past the ball valve 188 and into cylinder 34. The rate, and extent, of the movement of valve 200 and thus spool valve 184, will be related to, or proportional to, the magnitude and duration of the electrical signal provided for the energization of solenoid 198.

In summarizing the operation of the hydraulic assembly depicted in FIGS. 12–14, the key components of the assembly for adjusting piston 32 and thus the position of elevator 46 include the thirty horsepower motor 24, the piggyback pumps 25, 192 drive thereby, the hydraulic cylinder 34, and the valve 200 operated by solenoid 198. The motor and pumps run at all times for maximum efficiency. The valve 200, under the control of solenoid 198, can selectively (1) direct the hydraulic fluid past ball check valve 188 into cylinder 34, or (2) allow the hydraulic fluid to flow out of cylinder 34 and slowly past ball check valve 188 and through valve 200 before returning to reservoir 30, or (3) can route the fluid back to reservoir 30 when no vertical motion is called for by the operator. The electrical signal delivered to solenoid 198 is a DC signal that is produced by movement of one of the joysticks 53, 55 on the control panel 52 in the cab of the stacker crane. The amplitude of the signal is related to the extent of movement of the joystick 53 away from its normal, upright central position, while the polarity of the signal is determined by the direction of movement of the joystick, i.e., forward or rearward. Such arrangement enables the operator of the stacker crane almost infinite control over the speed and direction of the vertical motion of piston 32 and the elevator 46 connected thereto.

Several safety precautions are built into the semiautomated warehousing system to protect the operator from his own errors in judgment and against unforeseen mishaps, as well as to minimize property damage in the unlikely event of operator error and/or mechanical failure. As noted previously, the thirty horsepower motor 24 and pump 25 run at all times so that the elevator 46 on the stacker crane 10 can quickly be adjusted to the desired height. However, before the pump 25 can be turned on by manipulating a button on the control panel 52, precautions must be taken to be certain that hydraulic fluid is present in the appropriate conduits. If not, for any reason whatsoever, the pump will be severely damaged.

To insure that the requisite hydraulic fluid is present in the conduits, two conditions must be satisfied. First, the door at the rear of cab 48 must be closed, lest the operator slip out of the cab during its vertical movement, the closure of the door (as best seen in FIG. 4) closes a first switch 202. Second, a shut-off valve 204 in the line between filter 195 and the suction line must be opened so that the hydraulic circuits will be pressurized. To achieve this opened condition, handle 206 must be pivoted to engage limit switch 208, and fluid will flow under gravity and/or the pressure head produced in reservoir 30 into the hydraulic conduits. The switches 202 and 208 are wired in series, so that only after both conditions have been satisified can the pump 25 be turned on to enable the stacker crane to initiate vertical movement of elevator 46.

Ball check valve 188 is also selected with an eye toward minimizing potential losses to limb and property. Although the ball check valve can assume many forms, valve 188 is optimally selected as an electrically operated ratio ball check valve. The ratio of the forces to seat the valve relative to the forces to unseat the valve is 11:1, and the check valve is energized only in the down direction. Thus, if the electrical power delivered to the valve should fail for any reason, the valve would remain closed and the hydraulic fluid in cylinder 34 would keep the piston 32 and elevator 46 and cab 48 in a static position. The carriage and cab could not plummet downwardly with damage to life and limb.

The reservoir 30 may be described as being oversized. To illustrate, the hydraulic system employs fourteen to twenty-one gallons of hydraulic fluid, such as an oil exhibiting good stability while functioning at 150° F. and a boiling point between 220°–230° F. The twenty-one gallons corresponds to the maximum extension of the hydraulic piston 32. Reservoir 30 has a capacity of eighty gallons. Thus, the hydraulic fluid may be called upon for four-six operations before the initial charge of hydraulic fluid is recycled within the system. The hot fluid, which is heated by friction during its passage through the system, is introduced into the reservoir by a standpipe (not shown) located just below the upper surface of the fluid. The hot fluid will gradually settle toward the bottom of the reservoir, as it surrenders its excess heat to the large pool of cooler fluid standing in the reservoir. The reservoir 30 performs its cooling function effectively and without resorting to heat exchangers, cooling fans, radiating fins, or the like, and thus enchances the performance of the stacker crane.

Figure 15:
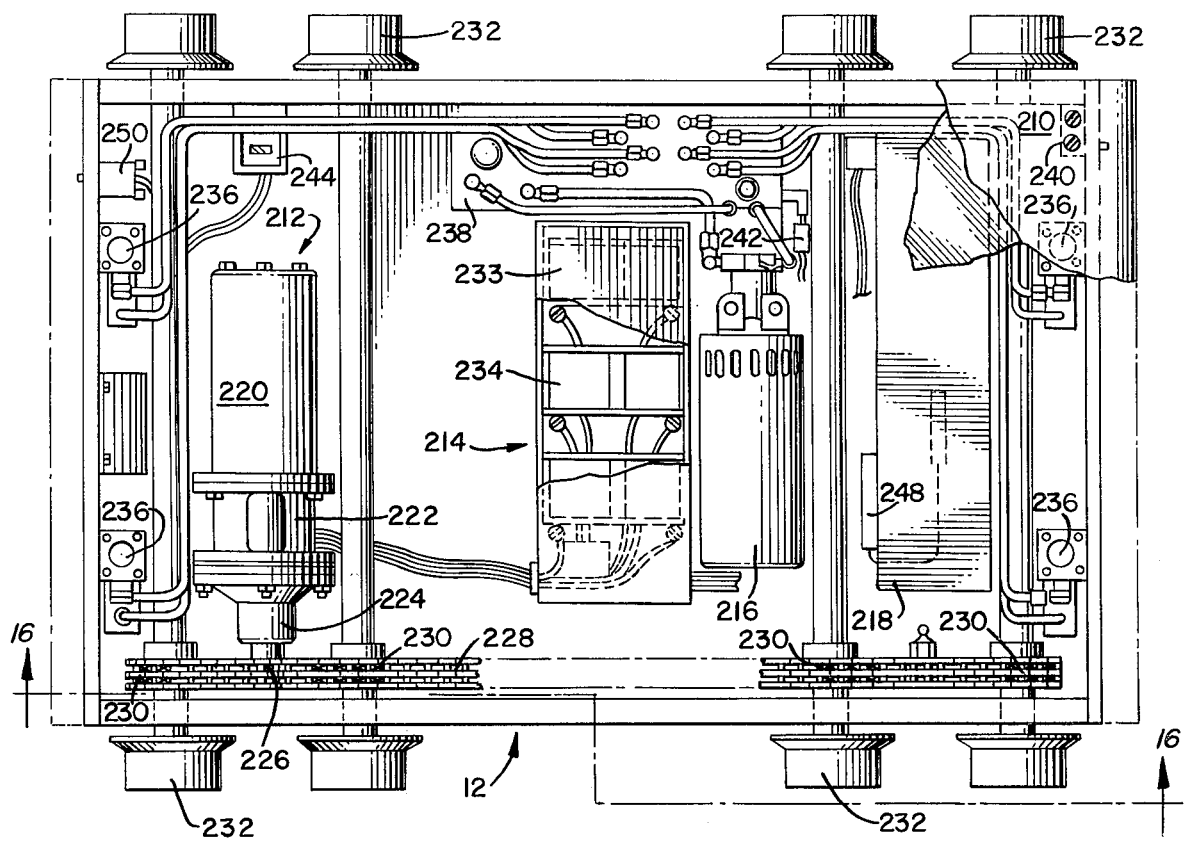
FIG. 15 is a top plan view of the transfer vehicle with all but a fragment of the top removed.

FIG. 15 is a top plan view of the transfer vehicle 12 with all but a fragment of cover, or top 210 removed to reveal the interior of the vehicle. The vehicle housing is fabricated from side and end pieces that are bolted together. The same components can be utilized, with but variations in size, to form transfer vehicles of different sizes.

Figure 16:
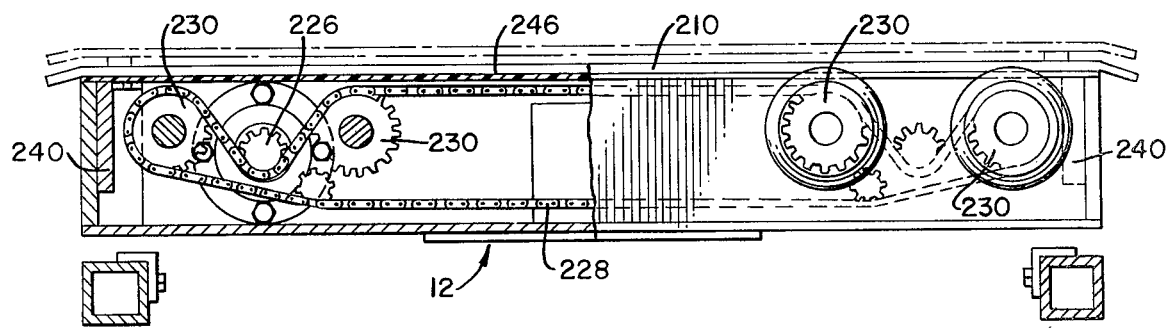
FIG. 16 is a side elevational view of the transfer vehicle, such view being taken along the line 16—16 in FIG. 15 and in the direction indicated.

Disposed within the box-like confines of vehicle 12 are the drive unit 212, the logic control package 214, the hydraulic pump 216, and the battery pack 218. The drive unit 212, as more fully shown in FIG. 16, comprises a permanent magnet motor 220 which is coupled via an adapter 222 to an in-line drive box, or gearless reducer, 224. A sprocket 226 on the output shaft of the gear reducer meshes with drive chain 228. Since the chain 228 passes over a sprocket 230 secured to each of the four parallel shafts extending across the transfer vehicle, the driving movement imparted by sprocket 226 is transmitted to all of the driving wheels 232 to move the transfer vehicle. The wheels are positioned outboard of the box-like body of the transfer vehicle.

The logic control package 214 includes a single-channel radio frequency (r.f.) radio receiver 233 which receives signals emanating from a transmitter (shown in FIG. 25) in the control panel 52 in the cab of the stacker crane in response to the operator's manipulation of the joystick 55. A decoder section 234 is situated adjacent to receiver 233, so tht upon receipt of a signal from the transmitter, the decoder section determines which operative function of the transfer vehicle has been selected by the operator. One segment of the decoder section responds to each unique command signal. In one decoder configuration, eight commands are envisioned, one command corresponding to each of the eight active positions that may be assumed by joystick 55. The eight commands include left and right travel into the racks, high or low speed operation, and top down or up. The remaining two commands may be reserved for intermediate speed and for operation of two vehicles in tandem.

Hydraulic pump 216 pressurizes four double-acting hydraulic cylinders 236 to elevate the cover 210 of the transfer vehicle 12. One cylinder 236 is situated inboard of each corner of the housing, and each cylinder receives hydraulic fluid from a specially designed manifold 238. The manifold 238 has eight hydraulic lines to supply the four cylinders; in such fashion, the four cylinders are simultaneously driven both upwardly and downwardly in a positive fashion. Guide blocks 240 are situated near each corner of the cover 210, so that the cover or top moves only in a vertical plane, i.e., remains horizontal, as the pistons are extended, and the cover cannot tilt or turn even under heavy loads. A pressure switch 242 is provided under the cover 210 to indicate that the cover has been fully raised, and a companion limit switch 244 indicates that the cover has been lowered completely. Also, a plastic shield 246 may be utilized under cover 210 of the transfer vehicle; such shield prevents dirt from entering the transfer vehicle while the cover is elevated and assists in keeping the interior of the vehicle moderately warm even when working in cold-storage warehouses. The extent of vertical movement of cover 210 is suggested by the dotted lines in FIG. 16.

The battery pack 218 includes twelve, two volt-two and a half amp sealed lead cells. The cells are connected in series so that the maximum power is available to drive the motor 220 in the transfer vehicle at top speed. The vehicle speed is reduced by introducing resistances into the series circuit. A thermostat 248 is operatively associated with the battery pack 218 for maintaining the temperature within the pack at a desired level.

One or more circuit breakers 250 are located on the opposite ends of the housing of the transfer vehicle. The circuit breakers are accessible from the exterior of the transfer vehicle. The circuit breaker 250 protects the electrical and hydraulic drives for the transfer vehicle against sustained overloads. Also, the same circuit breaker is employed to disable the transfer vehicle when not in use.

Figure 17:
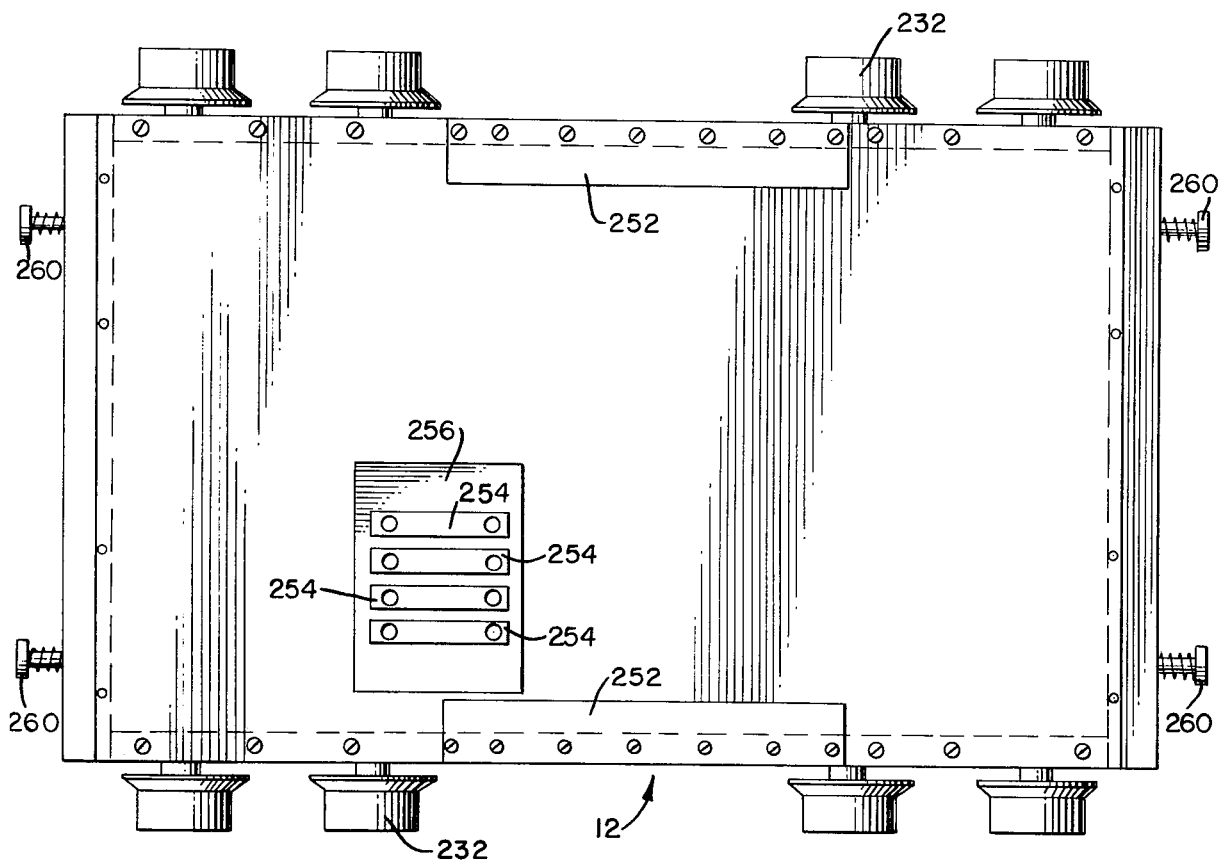
FIG. 17 is a bottom plan view of the transfer vehicle.

FIG. 17 shows the underside of the transfer vehicle 12, particularly the pair of metallic stop bars 252 positioned near the middle of the body and spaced along the opposite sides thereof and the several contacts 254 located below the bottom plane of the transfer vehicle in a recess 256. The contacts 254 cooperate with spring-loaded fingers situated on the elevator 46 in the "home position", so that three phase a.c. power is delivered over a bus bar to the battery pack 218 to charge same; the fourth contact serves as a ground. Also, while the battery pack is being recharged, an aluminum heat retaining shield 258 (not shown in FIG. 17 but visible in FIG. 22) is also being heated. Such shield retains heat within the box-like interior of transfer vehicle 12, particularly in the vicinity of the battery pack 218, so that all of the components will remain within a reasonable range of working temperatures even though the transfer vehicle is operating in a cold-storage environment with sub-freezing temperatures. The heat shield is usually not needed when the transfer vehicle is operating under ambient temperatures. Shock absorbers 260 are provided on opposite ends of the transfer vehicle; these absorbers function in much the same manner as the shock absorbers 35 on the base 20 of the stacker crane.

Figure 18:
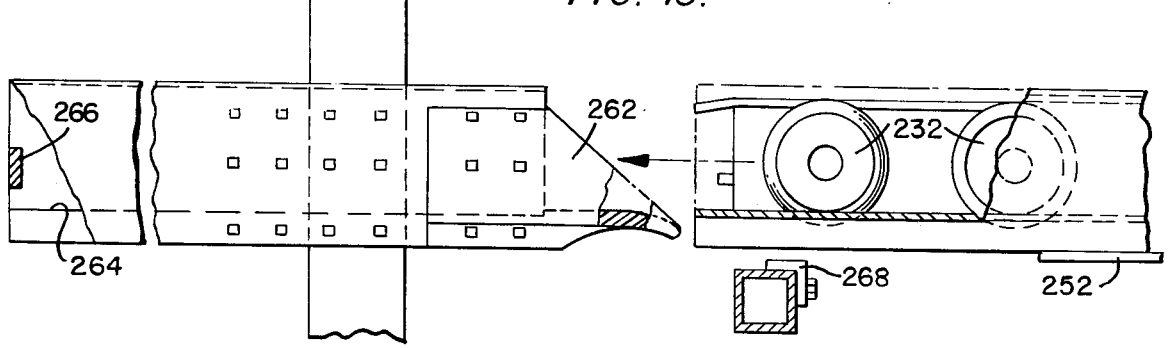
FIG. 18 is a fragmentary side elevational view of a transfer vehicle driving toward a nosing on a storage rack.

FIG. 18 shows the vehicle 12 approaching the nosings 262 secured to each rail within the storage racks 14 proximate to the aisle through which the stacker crane travels. The wheels 232 of the transfer vehicle 12 pass smoothly from the rails on the elevator 46 onto the nosings 262 as the vehicle is driven away from its "home position" on the elevator 46 into the storage rack situated at the selected lane and tier location. The nosings funnel, or direct, the wheels 232 onto the support surfaces 264 of the racks.

At the end of each storage rack furthest removed from the aisle, or at any other selected position, an end stop 266 is disposed. When shock absorber 260 on the transfer vehicle contacts, and thus senses, the end stop 266, the vehicle cannot proceed any further in the same direction, but must be driven or pushed in the opposite direction to return to its home position on elevator 46. In effect, the end stop precludes damage to the transfer vehicle regardless of the position of the joystick 55 under the control of the operator.

Figure 19:
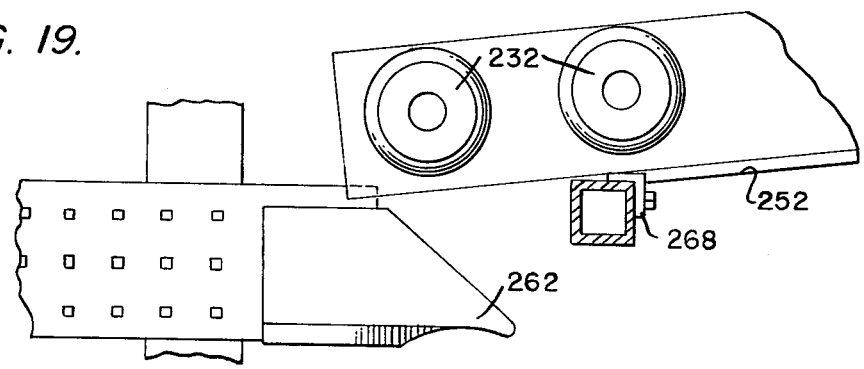
FIG. 19 is a fragmentary side elevational view of the transfer vehicle with the stop bars thereon engaging the stop members on the stacker crane.

FIG. 19 illustrates yet another of the significant failsafe features of the instant semi-automated warehousing system. If the nosings 262 are missing from the selected storage rack, or if the operator inadvertently attempts to command the vehicle to enter a non-address, or if the elevator has not been brought into alignment with a storage rack, the transfer vehicle, as it leaves its home position on the elevator 46 of the stacker crane, will tilt sharply downwardly. The pronounced tilt will cause stop bars 252 to engage stop angles 268 secured to the lateral edges of the elevator; such engagement between the stop bars 252 and the stop angles 268 halts the transfer vehicle in a canted position without damage to the elevator or vehicle. It will thus be seen that the stop angles 268 cooperate with the body of the transfer vehicle, that is, contact the stop bar portion of such a transfer vehicle body, to automatically stop the transfer vehicle's movement when the transfer vehicle is improperly oriented, i.e., not parallel to the upper surface of the elevator. Observing an error in judgment, the operator in the cab 48 of the crane can manipulate the joystick 55 in the opposite direction to drive the transfer vehicle backwards to its home position. Alternatively, the transfer vehicle can be manually pushed back into a horizontal plane and rolled backwards to its home position. Although stop angles 268 depict a preferred construction, other stop members could be used with good success.

FIGS. 20 and 21 depict, in sequence, the underside of transfer vehicle 12 as the vehicle approaches its home station 270 on elevator 46 of the stacker crane 10. A support 272 is secured to the base 274 of the home station, and a plurality of levers 276 are joined to shaft 278 for movement thereabout. A pin 280 is secured to one end of each lever, and a similar pin 282 is secured to support 272. The ends of spring 284 are secured to the pins and the spring exerts a biasing force upon lever 276. A non-conductive roller 286 is secured by a pin 288 to the remote end of lever 276, and the biasing force of spring 284 urges the roller into engagement with the underside of the transfer vehicle 12. A contact block 290 is also joined to the remote end of lever 276, but the roller extends upwardly above the contact block.

As shown by the directional arrow in FIG. 20, the transfer vehicle 12 has not yet reached its home station 270 on the elevator of the stacker crane. The contact rollers 286, which ride along the underside of the transfer vehicle, retain the contact blocks 290 away from engaging the underside of the vehicle and reduce unnecessary wear on the blocks. As shown in FIG. 21, the vehicle has reached its home station and the recess 256 in the underside of the vehicle is properly situated; see FIG. 17. Then, the rollers fit into spaces outside contacts, or busbars 254, and the springs 284 press the contact blocks 290 into engagement with the contacts 254. Once secure mechanical contact is obtained between contacts 254 and contact blocks 290, the battery charger situated on the stacker crane introduces a powerful electrical charge into the battery pack 218 within transfer vehicle 12. Since the battery pack is charged every time the transfer vehicle is in its home position, and the transfer vehicle spends more time aboard the stacker crane than in traveling through the storage racks on its sundry missions, the transfer vehicle is always charged to its full potential and is available for effective operation.

FIG. 22 shows another structural detail of the transfer vehicle 12 that further enhances its effectiveness. While the battery pack 218 is being charged at the home station, the charger supplies, to the contacts 254, via contact blocks 290, sufficient power to heat aluminum shield 258. The shield is located between the battery pack and the floor of the transfer vehicle, and the aluminum material is capable of retaining heat for extended periods of time. The retained heat keeps the batteries at a moderate temperature, and makes certain that the transfer vehicle will not become sluggish when functioning for extended periods of time in cold storage warehouses.

Figure 23:
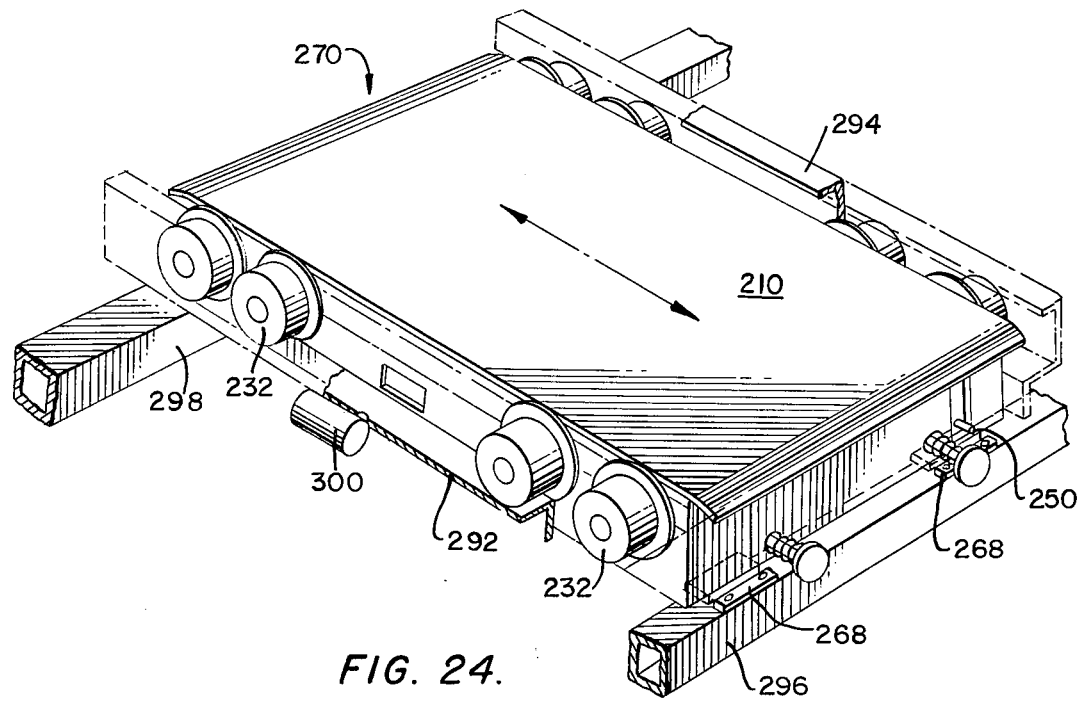
FIG. 23 is a perspective view of the transfer vehicle centered in its home position on the elevator.

FIG. 23 shows the transfer vehicle 12 on spaced rails 292, 294 at its home station 270 on the elevator 46 of the stacker crane. The transfer vehicle is centered on the tracks between the structural members 296, 298 that define the left and right lateral edges of the elevator 46. Stop angles 268 are visible on member 296, incidentally. A single reflex control 300 is employed in conjunction with reflectors, or reflective strips, on the side of the transfer vehicle, to center the vehicle; alternatively, limit switches, or a combination of limit switches and photoelectric cells could be used for such purpose. Once centered, the vehicle 12 does not roll out of its fixed position, because the vehicle is dynamically braked and the brake must be released by a first remote ratio signal before the vehicle is receptive to a second remote signal that will cause the vehicle to drive off the elevator.

The wheel 232 of the transfer vehicle ride along the rails 292, 294 before leaving the elevator to ride along the aligned support surfaces 264 of the storage racks 14. The operator manipulates joystick 55 on the control panel 52 in the cab of the stacker crane to drive the transfer vehicle in the desired direction and at the selected speed. Once centered, the battery charger charges the battery pack 218 within the transfer vehicle and the joystick 53 is enabled so that the elevator 46 on the stacker crane can be adjusted. However, until the transfer vehicle is centered, interlocks are operative to prevent the vertical movement of the stacker crane at its normal rate. At most, the elevator 46 can be adjusted slowly to insure proper alignment with the support surfaces of the racks. The interlocks can override, and defeat, the operator's mistaken efforts to prematurely move elevator 46 prior to the completion of the mission assigned to the transfer vehicle.

Figure 24:
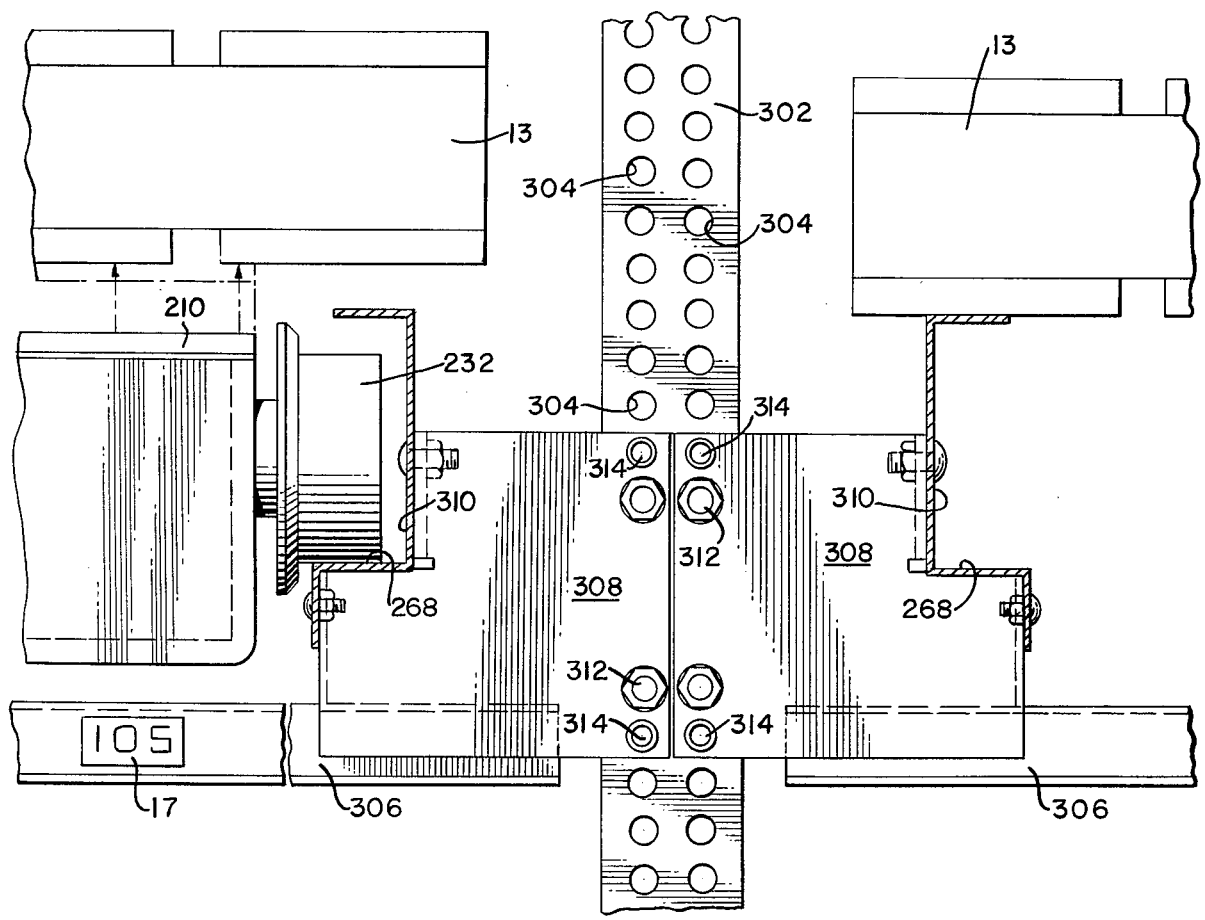
FIG. 24 is a fragmentary front elevational view, on an enlarged scale, of a storage rack with the transfer vehicle travelling thereupon.

FIG. 24 shows that each support rack includes a vertical column 302 with several sets of holes 304 formed therein, a horizontal member 306, and a plate 308 for joining to the vertical column. The C-shaped rails 310 are bolted to the plates 308 and the plates are bolted to column 302 by unique L-shaped bolts 312. The positioning of plate 308 on the column 302 is achieved on the ground prior to pulling the column upright by forcing load pins 314 into the desired holes; the L-shaped bolts 312 are then tightened by an impact wrench, but the time and effort required to assemble and erect the storage racks has been significantly reduced. Placards 17, which identify the lane and tier location within the racks 14, are secured to member 306.

The extent of upward travel of the cover, or top, 210 of the transfer vehicle 12 is also shown by the directional arrows in FIG. 24; the travel covers approximately one and a half inches. Normally, the bottom of the pallet 13 rests about three quarters of an inch below the upper, horizontally projecting flange of the rails 310, and when fully extended, the pallet is raised three quarters of an inch above such reference point. This tolerance leaves sufficient leeway to preclude jagged surfaces on the underside of the pallet, deviations from desired tolerances, or the like, from impeding, or perhaps stalling the transfer vehicle within the storage racks during its travels.

FIG. 25 is a top plan view of the cab 48 of the stacker crane and a fragmentary top plan view of the home station for the transfer vehicle upon the stacker crane. The transfer vehicle is absent from the home station 270, so that the various relationships can be more readily observed.

The cab 48 is formed simply from structural tubing in a cube-like arrangement for optimum visibility even when a considerable load is being transported by the transfer vehicle. A signal transmitting antenna 316 is situated in the upper right hand corner of the cab for transmitting control signals to the transfer vehicle, and lights 318 are recessed in the overhead tube in the cab. The control panel 52, which includes the transmitter coupled to antenna 316, is situated at the right hand side of the cab so that the operator's view looking straight ahead is unimpaired. The control panel receives its electrical power from power line 54 which communicates with the overhead power distribution line 56. The seat for the operator is absent from FIG. 25 so that the heater 320, which is disposed under the seat, is visible. The heater 320 maintains the cab at a comfortable temperature under all operating conditions. A citizens' band radio 322, with its antenna 324, are situated on the left side of the cab.

A battery charger 326, which is commercially available as a Brute III-Model, is situated outboard of the cab. The charger 326 delivers power over leads 328 to three of the contact blocks 290 situated at the home station on the elevator of the stacker crane. As previously described, the blocks are biased upwardly into contact with the contacts 254 situated in the recess 256 on the underside of the transfer vehicle 12. The fourth lever arm does not have a contact block 290 secured thereto; such lever arm serves as a spare and is readily available when, and if, necessary.

Powerful lamps 330 are situated on the opposite ends of spaced rails, such as 292, to illuminate the depths of the storage racks. The reflex control 300, which is used to center the transfer vehicle on the rails 292, 294 at the home station, is also shown. The roof for the cab 48 is indicated by reference numeral 332, and braces 334 are also visible.

Figure 26:
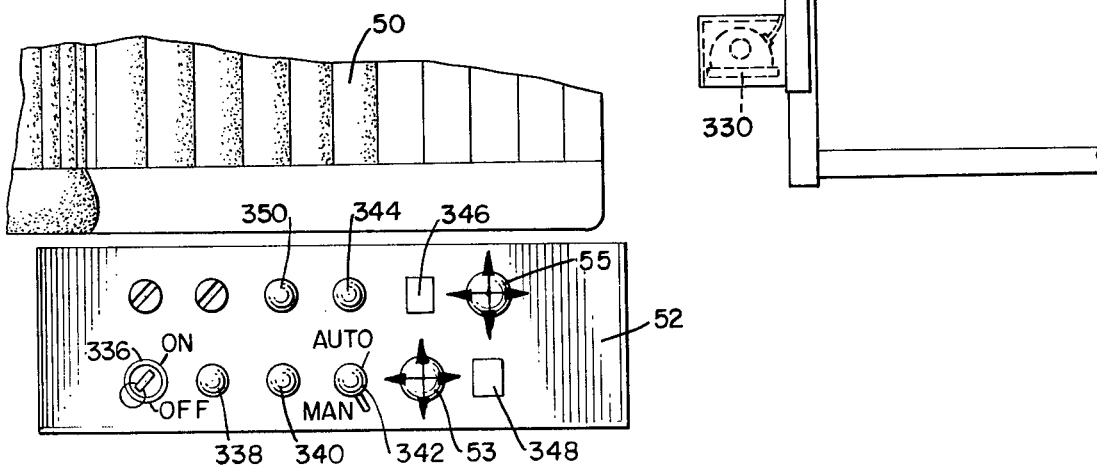
FIG. 26 is a top plan view of the control console situated in the cab of the stacker crane.

FIG. 26 is a top plan view of the control panel 52 that is situated in the cab to the right of seat 50. Various manual control instrumentalities and indicator lights are located on the panel within easy reach of the operator. For example, the control panel includes a keylock selector switch 336 which must be placed in the ON position before any of the other controls can be energized, a push button 338 for turning on the motor 24 which drives pump 25, and a second illuminated push button 340 for indicating that the pump is running. A selector switch 342, which is rotated between MANUAL and AUTOMATIC positions, determines the operational mode for the motor set 81 of the horizontal drive train for the stacker crane and highlights anothwer significant operational feature of the stackwer crane 10. When the switch is set in the MANUAL mode, the stacker crane is manually adjusted relative to the storage racks 14 by the operator by manipulating joysticks 53 and 55 as he visually reads the lane and tier locations visible on placards 17 secured to racks 14. The crane is stopped when joystick 53 is moved to its central, neutral position. Usually to propel the stacker crane, the operator will move the joystick from its neutral position and maintain same in its fast speed until nearing the desired location; then the operator moves the joystick to the slow speed position to cause the crane to decelerate prior to stopping at the selected location.

However, when the switch 342 is set in the AUTOMATIC mode, the stacker crane comes to a halt in a unique fashion. As the crane travels at high speed towards the desired lane, the operator reads the placards 17 and then shifts the joystick from the fast forward position into the creep speed position one lane prior to the desired location. The crane stops automatically from creep speed in the AUTOMATIC mode, for the reflex control 88 detects the presence of the next reflector 86 on guide tube 80 and provides a control signal that energizes brake 83 of the motor set 81 to stop the crane at the next legitimate address. Such automatic stopping feature is disabled, however, when the selector switch 342 is in its MANUAL position.

A horn button 344 is situated in proximity to joysticks 53, 55, along with an indicator light 346 that is lit only when the transfer vehicle is located on its home station 270. Joystick 53 controls the operation of the hydraulic cylinder to alter the position of elevator 46; and joysticks 53, 55 can be operated concurrently. Indicator lights 348 and 350 are lit when the lights in the cab and on the stacker crane are turned on. The remaining lights and buttons on the control panel may be utilized for diverse other purposes.

The directional arrows in FIG. 26 denote that the joysticks 53, 55 are capable of compound movement, and may assume a plurality of distinct positions in addition to a central, neutral position. The joysticks are biased to a central, neutral "off" position. The movement of joystick 55 governs the operation of the radio transmitter, situated beneath control panel 52 and operatively associated therewith, and the movement of joystick 55 away from its neutral position causes the transmitter to send out a particular tone corresponding to the direction of such movement. If joystick 55 is moved to the right, the transfer vehicle will move to the right; similarly, if the joystick is moved to the left, then the transfer vehicle will move in the same direction. Joystick 55 can be moved into eight distinct positions, and eight particular tones, or sequences of tones, are produced by the radio transmitter. More specifically, joystick 55 can be moved leftwards into a first position which, in sequence, turns on the transmitter, sends a signal establishing the direction to be moved, and releases the dynamic brake which holds the transfer vehicle centered upon elevator 46. If the joystick is then moved leftwards into a second position, another tone is produced which causes the transfer vehicle to move at a slow speed. If the joystick is then moved leftwards into its extreme position, an additional distinct tone is produced which causes the transfer vehicle to switch into a high speed. A similar set of three positions is provided for the rightward movement of the joystick.

The seventh and eighth positions of the joystick 55 relate to the raising and lowering of the top of the tranfer vehicle. Pushing the joystick 55 forward lowers the top, or cover 210, while pulling the joystick rearwardly raises the top.

The joysticks may be moved within a cruciform-shaped path, or may be moved within an X-shaped path, or within some other path that lends itself to compound motion and a plurality of distinct settings or locations.

FIG. 27 schematically depicts the relationship between the radio transmitter 352, which is situated within control panel 52 and is directly wired to joystick 55. The movement of joystick 55 into each of its distinct positions is transmitted, via the encoder section of the transmitter to the transfer vehicle, and the decoder logic on-board the transfer vehicle translates the tone into a distinct operational command.

The distinct tone is beamed to the receiver 233 which is an integral part of decoder section 234 of the transfer vehicle. The decoder 234, in turn, sends out commands, as dictated by the tone received from transmitter 352, to control box 354 to cause the battery pack 218 to energize the drive motor and/or the pump motor. The drive motor first receives a signal to turn itself on, and then receives a second signal indicating fast or slow speed and the direction of lateral movement (left or right). When the cover of vehicle 12 has been fully raised, or lowered, by the pump motor 216 pressurizing the double-acting pistons, then the hydraulic pressure switch 242 detects the fully "bottomed out" condition and sends a signal to the control box 354 and thence to the pump motor 212 to turn the pump motor off, lest the motor burn itself out. The solenoid valve 356 is shifted in response to the command signal received from the control box 354 to allow the hydraulic fluid to positively drive the pistons down or positively drive the pistons upwardly, thus raising or lowering the cover, or top, on the transfer vehicle and the load 13, 15 imposed thereon. A check valve may be introduced into the system so that the pistons can retain the cover on the transfer vehicle elevated even after the pump motor has been turned off. Alternatively, the pump motor can continue to operate to maintain the pistons extended, but the hydraulic fluid is just recirculated through the system.

FIG. 28 depicts a pair of battery-powered, radio-controlled transfer vehicles 12A, 12B operated in tandem. Additional distinct tones and commands will be added to the capacity of the system to enable the vehicles to function effectively in pairs.

Other modifications and refinements in the semiautomated warehousing system too numerous to mention will readily occur to the skilled artisan working in the technologies to which this invention appertains. For example, a pulse coded type of laser control could be substituted for the radio control means. Also, the roles of the pressure limit switch and the switch used to detect the position of the cover plate of the transfer vehicle could be reversed. The control circuits could be arranged in different ways without sacrificing performance. Also, although load-carrying pallets are illustrative of unitized loads, the term unitized loads has a generic connotation, and embraces mesh bags, shrink-fitted plastic sleeves, etc. Furthermore, the term "elevator" used to identify component 46 might also be deemed to be a —carriage—. Consequently, the appended claims should be liberally construed in a manner commensurate with the scope of the invention expressed in the foregoing specification, and should not be narrowly construed in accordance with their literal terms.

I claim:

1. A stacker crane for use in a warehousing system comprising:
    (a) spaced masts,
    (b) a headpiece joining said masts together at the top thereof and a base joining said masts together at the bottom thereof,
    (c) wheels joined to said base and adapted to ride along a track located in a floor,
    (d) an elevator spanning the space between said masts,
    (e) a hydraulic cylinder and a piston extensible therefrom,
    (f) a moveable sheave nest secured to said piston,
    (g) chain means fixed at one end to one of said masts and fixed at the other end to said elevator with the intermediate length passing about said moveable sheave, and
    (h) hydraulic system means, including said hydraulic cylinder, for actuating said piston relative to said cylinder to shift said moveable sheave relative to said chain means and thereby alter the position of said elevator; wherein said hydraulic system means comprises: a power supply circuit including a reservoir containing hydraulic fluid secured to one of said masts, a main pump, a motor for supplying power to said pump, conduits interconnecting said reservoir, said pump and said hydraulic cylinder so that the pump can withdraw fluid from the reservoir and supply the fluid to the cylinder to extend the piston therefrom and a proportioning valve connected between the main pump and the hydraulic cylinder, the position of the proportioning valve regulating the volume of hydraulic fluid flowing toward said hydraulic cylinder, and
    a control circuit for regulating said power supply circuit, said control circuit including a second pump smaller than said main pump connected thereto in piggyback fashion and also powered by said motor, a control valve and conduits connecting said second pump and said control valve to said proportioning valve to exert a biasing force thereon.

2. The stacker crane as defined in claim 1 wherein a vertically extending track is secured to one of said masts, said movable sheave nest has guide rollers secured thereon, and said guide rollers roll along said track.

3. The stacker crane as defined in claim 1 wherein said chain means consists of a pair of lift chains of fixed length.

4. A stacker crane as defined in claim 3 wherein said spaced masts consist of a pair of masts, and a pair of standards extend upwardly from opposite sides of said elevator, one end of one of said pair of chains being anchored to one of said standards and one end of the other of said pair of chains being anchored to the other of said standards.

5. A stacker crane as defined in claim 4 wherein a first rib extends vertically along one of said pair of masts and a second rib extends vertically along the other of said pair of masts, both of said standards having guide rollers which ride along the ribs to maintain the elevator in a fixed path during its travel.

6. The stacker crane as defined in claim 1 wherein said masts are fabricated from rectangular tubing in a truss-like configuration.

7. The stacker crane as defined in claim 1 wherein an electrical motor set is secured to one of said masts for driving the stacker crane along the tracks, said motor set including a first, high-speed motor and a second, low-speed motor mounted on a common shaft that transmits power to said wheels for propelling said stacker crane along the track.

8. The stacker crane as defined in claim 7 wherein a solenoid operated brake is operatively associated with said motor set, said brake normally disabling said motor set.

9. The stacker crane as defined in claim 1 wherein said power supply circuit further includes a check valve connected between said proportioning valve and said hydraulic cylinder.

10. The stacker crane as defined in claim 9 wherein said check valve is a ratio check valve that is readily unseated to admit hydraulic fluid into the hydraulic cylinder but requires far greater force to unseat same when the hydraulic fluid exits from the hydraulic cylinder.

11. The stacker crane as defined in claim 1 wherein said control valve is a solenoid operated valve, and means are provided on said stacker crane to energize said solenoid to operate the control valve and thereby adjust the position of the proportioning valve.

12. The stacker crane as defined in claim 1 wherein a socket is defined in the base adjacent to one of said masts, and the lower end of said hydraulic cylinder is seated in said socket while the upper end of said cylinder is secured to the adjacent mast by a bracket, the hydraulic cylinder thus extending parallel to the mast and perpendicular to the base.

13. The stacker crane as defined in claim 1 wherein a cab for a crane operator is secured to one side of the elevator in proximity to one of said masts, and manual controls for the operation of the stacker crane are located in the cab for manipulation by the operator.

14. The stacker crane as defined in claim 1 wherein said hydraulic system means includes a reservoir adapted to store hydraulic fluid, said reservoir possessing a capacity several times greater than the capacity of the hydraulic cylinder, whereby the reservoir serves as a heat sink for cooling the hydraulic fluid after its use in the hydraulic cylinder.

15. A stacker crane for use in a warehousing system comprising:

spaced masts;
a headpiece joining said masts together at the top thereof and a base joining said masts together at the bottom thereof;
wheels joined to said base adapted to ride along a track located in a floor;
an elevator spanning the space between said masts;
a hydraulic cylinder and piston extensible therefrom;
a moveable sheave nest secured to said piston;
chain means fixed at one end to one of said masts and fixed at the other end to said elevator with the intermediate length passing about said moveable sheave;
hydraulic system means, including said hydraulic cylinder, for actuating said piston relative to said cylinder to shift said moveable sheave relative to said chain means and thereby alter the position of said elevator;
a pair of guide rails secured to the upper piston of the elevator, said guide rails being adapted to accomodate a transfer vehicle; and
a stop member secured at the front of the upper elevator surface inwardly of said guide rails and substantially perpendicular thereto, said stop member cooperating with a transfer vehicle's body so as to automatically stop the latter's movement when such a transfer vehicle is improperly oriented relative to the surface of said elevator.

16. The stacker crane as defined in claim 15 further including means positioned in proximity to said guide rails for centering a transfer vehicle thereon.

17. The stacker crane as defined in claim 15 wherein electrical contacts and a battery charger are located on the elevator, said charger supplying electrical power to said contacts for distribution to a transfer vehicle.

18. A stacker crane for use in a warehousing system comprising:

(a) spaced masts,
(b) a headpiece and a base joining the masts together,
(c) wheels secured to said base and adapted to ride along a floor mounted track located proximate thereto,
(d) an elevator spanning at least the space between said masts,
(e) a cab with an access door situated on said elevator, the closure of said door tripping a first switch,
(f) means for adjusting the vertical position of said elevator, said means including a reservoir for hydraulic fluid, conduits, a pump for circulating said fluid through said conduits, a motor for driving said pump, and a valve disposed in said conduits for controlling the flow of hydraulic fluid,
(g) at least one manually operable control situated in said cab,
(h) said manually operable control normally actuating said means for adjusting the elevator vertically,
(i) and a second switch operatively associated with said valve,
(j) said second switch being tripped when said valve is opened to permit flow of hydraulic fluid from the reservoir through the pump,
(k) said first and second switches being connected in series so that both of said switches must be tripped before the vertical position of the elevator can be adjusted by said manual control.

* * * * *